(12) United States Patent
Kopikare

(10) Patent No.: US 11,531,998 B2
(45) Date of Patent: Dec. 20, 2022

(54) PROVIDING A CONVERSATIONAL DIGITAL SURVEY BY GENERATING DIGITAL SURVEY QUESTIONS BASED ON DIGITAL SURVEY RESPONSES

(71) Applicant: Qualtrics, LLC, Provo, UT (US)

(72) Inventor: Milind Kopikare, Draper, UT (US)

(73) Assignee: Qualtrics, LLC, Provo, UT (US)

( * ) Notice: Subject to any disclaimer, the term of this patent is extended or adjusted under 35 U.S.C. 154(b) by 427 days.

(21) Appl. No.: 16/117,236

(22) Filed: Aug. 30, 2018

(65) Prior Publication Data

US 2019/0066136 A1 Feb. 28, 2019

Related U.S. Application Data

(60) Provisional application No. 62/551,904, filed on Aug. 30, 2017.

(51) Int. Cl.
| | |
|---|---|
| G06Q 30/02 | (2012.01) |
| H04L 51/02 | (2022.01) |
| G06N 20/00 | (2019.01) |
| G06N 5/04 | (2006.01) |
| G06F 40/30 | (2020.01) |
| G06F 40/35 | (2020.01) |
| G06N 5/00 | (2006.01) |
| G06N 7/00 | (2006.01) |
| G06N 3/04 | (2006.01) |

(52) U.S. Cl.
CPC ......... *G06Q 30/0203* (2013.01); *G06F 40/30* (2020.01); *G06F 40/35* (2020.01); *G06N 5/041* (2013.01); *G06N 5/046* (2013.01); *G06N 20/00* (2019.01); *G06Q 30/0282* (2013.01); *H04L 51/02* (2013.01); *G06N 3/0454* (2013.01); *G06N 5/003* (2013.01); *G06N 7/005* (2013.01)

(58) Field of Classification Search
CPC . G06Q 30/0203; G06Q 30/0282; G06F 40/30
See application file for complete search history.

(56) References Cited

U.S. PATENT DOCUMENTS

| | | | |
|---|---|---|---|
| 8,996,425 B1* | 3/2015 | Johnson | G06Q 30/0282 705/347 |
| 10,380,246 B2* | 8/2019 | Clark | G06F 40/242 |
| 2006/0121434 A1* | 6/2006 | Azar | G06Q 30/0282 434/350 |
| 2011/0077988 A1* | 3/2011 | Cates | G06Q 30/0203 704/E15.001 |

(Continued)

*Primary Examiner* — Renae Feacher
(74) *Attorney, Agent, or Firm* — Keller Preece PLLC

(57) ABSTRACT

The present disclosure is directed toward systems, methods, and non-transitory computer readable media for generating conversational survey questions. The systems and methods analyze a received survey question response to identify characteristics of a survey response, including topics and other response features. For example, the systems can determine a sentiment associated with a given product or service that a respondent expresses within a response. Based on the determined sentiment, and further based on a set of logic rules received from a survey administrator, the systems and methods generate provide conversational follow-up questions associated with the identified product or service.

20 Claims, 19 Drawing Sheets

(56) References Cited

U.S. PATENT DOCUMENTS

| | | | | |
|---|---|---|---|---|
| 2011/0106731 A1* | 5/2011 | Pearson | ................... | G06N 5/04 706/11 |
| 2013/0166461 A1* | 6/2013 | Austin | ................... | G06Q 10/00 705/310 |
| 2014/0316856 A1* | 10/2014 | Williams | ................ | G06F 16/33 705/7.32 |
| 2015/0206156 A1* | 7/2015 | Tryfon | .................... | G06F 40/30 705/7.32 |
| 2015/0208140 A1* | 7/2015 | Choi | ................. | H04N 21/6125 725/32 |
| 2015/0370993 A1* | 12/2015 | Moturu | .................. | G16H 50/50 703/6 |
| 2016/0162569 A1* | 6/2016 | Erle | ...................... | G06F 16/288 707/739 |
| 2018/0005140 A1* | 1/2018 | Chittilappilly | ......... | G06N 20/00 |
| 2018/0189457 A1* | 7/2018 | Plummer | ................ | G16H 50/20 |
| 2019/0325023 A1* | 10/2019 | Awadallah | ............ | G06F 40/216 |

* cited by examiner

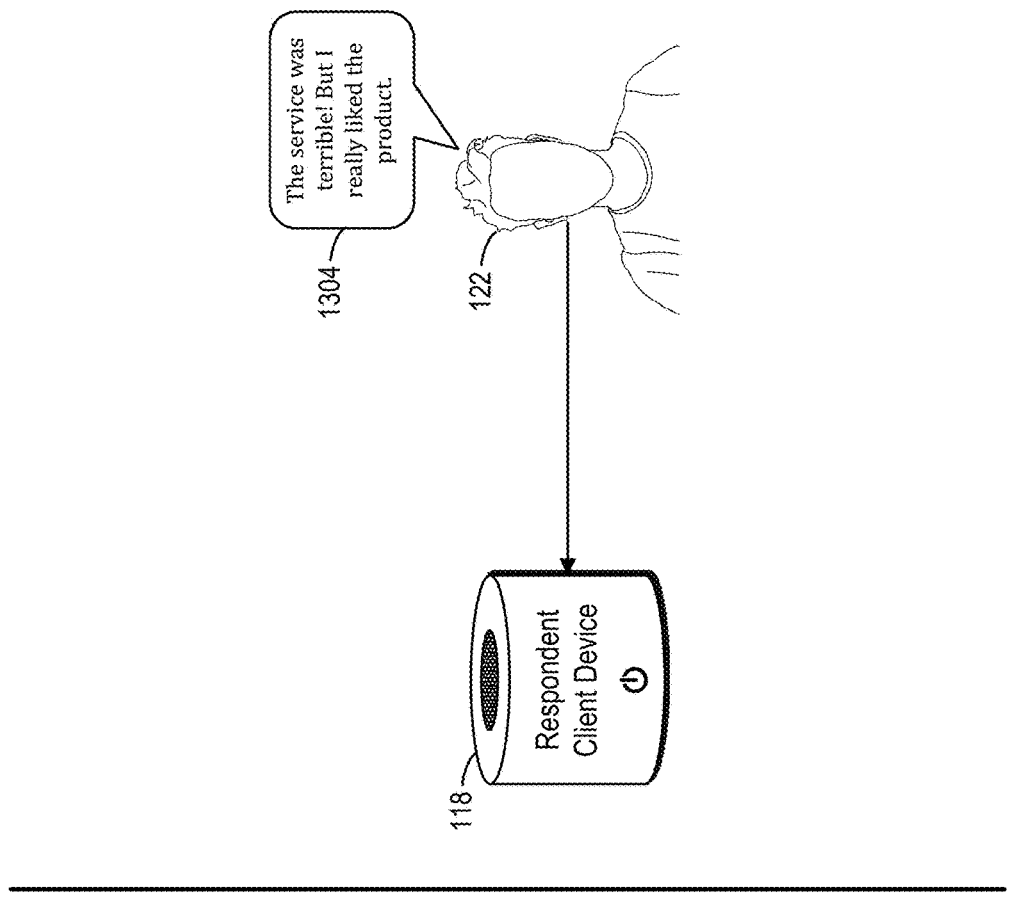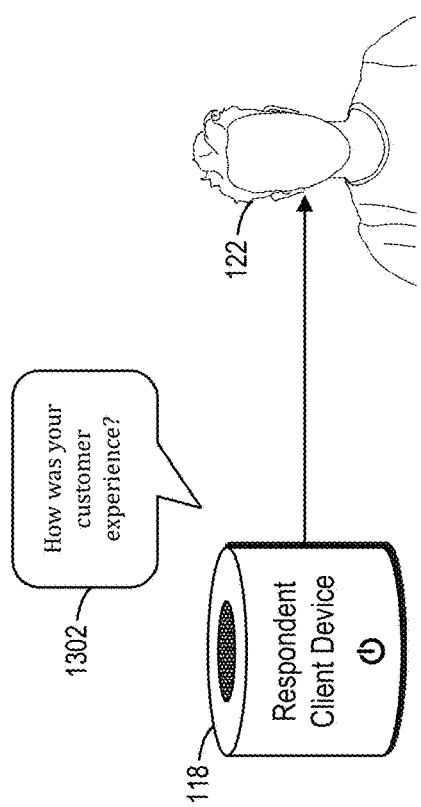
Fig. 13

PROVIDING A CONVERSATIONAL DIGITAL SURVEY BY GENERATING DIGITAL SURVEY QUESTIONS BASED ON DIGITAL SURVEY RESPONSES

CROSS REFERENCE TO RELATED APPLICATION

The present application is a non-provisional application of U.S. Provisional Application No. 62/551,904, filed Aug. 30, 2017. The aforementioned application is hereby incorporated by reference in its entirety.

BACKGROUND

Business and individuals alike often desire to receive feedback pertaining to goods and/or services. For example, a business often wishes to know how its products and/or services are perceived by the community. To gain a perspective of consumer opinion regarding products and/or services, businesses distribute electronic surveys in an effort to collect information from a consumer base. More than just receiving any electronic survey data, however, business and individuals desire to receive actionable feedback. Unfortunately, many conventional electronic survey systems have several technological and systemic disadvantages that limit the ability for conventional systems to extract specific and actionable feedback from survey respondents.

For example, in order to efficiently create and administer an electronic survey, conventional electronic system often use a structured survey format meant to be a one-size-fits-all type of survey. For example, data structures, electronic survey organization and flow, and other technological constraints prohibit the creation of individualized electronic surveys that are tailored to a particular user's experience. Accordingly, many conventional electronic surveys produce information that is too general or too abstract to create a complete understanding of an individual experience and/or result in an actionable response to the electronic survey.

To elaborate, many conventional survey systems provide a predetermined set of survey questions pertaining to a particular good and/or service. Thus, in cases where a consumer has a specific issue with a good and/or service, conventional survey systems may prevent the consumer from providing valuable feedback pertaining to a potential defect or other issue due to the one-size-fits-all survey format. By providing survey questions in a predetermined and rigid format, conventional survey systems may even guide consumers away from addressing pertinent issues, and may therefore prevent consumers from providing the feedback that the survey is intended to extract from respondents.

Many of the above described disadvantages come from the conventional rigid nature of presenting a digital survey via conventional computer user interfaces. For example, because of the nature of presenting a digital survey to a respondent via a computer screen, conventional survey systems tend to be rigid in the administration of a digital survey, or in other words, conventional survey systems are not able to react and adjust as a respondent provides responses to survey questions. Rather, conventional survey systems simply receive a response, store the response, and proceed to rigidly provide a predefined next survey question. Indeed, because of the digital environment needed to collect digital survey responses, convention survey systems are not able to adapt or react to a particular respondent's tone, complaint, need, or other individualized expression given in response to a digital survey question.

Thus, there are several disadvantages with regard to conventional digital survey systems.

SUMMARY

One or more embodiments described herein provide benefits and solve one or more of the foregoing or other problems in the art with systems, methods, and non-transitory computer readable media for providing a conversational survey question generator. For example, the systems described herein can receive a response to a digital survey question and can analyze the response to determine a response feature (e.g., sentiment, magnitude, etc.) associated with the response. Based on the analysis of the response, the systems can identify a logical condition within a survey flow that corresponds to the determined response feature, and can further generate a follow-up question based on the identified condition within the survey flow.

Additional features and advantages of the present application will be set forth in the description which follows, and in part will be obvious from the description, or can be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 13 illustrates an example environment for responding to audio survey questions in accordance with one or more embodiments;

DETAILED DESCRIPTION

Figure 1:
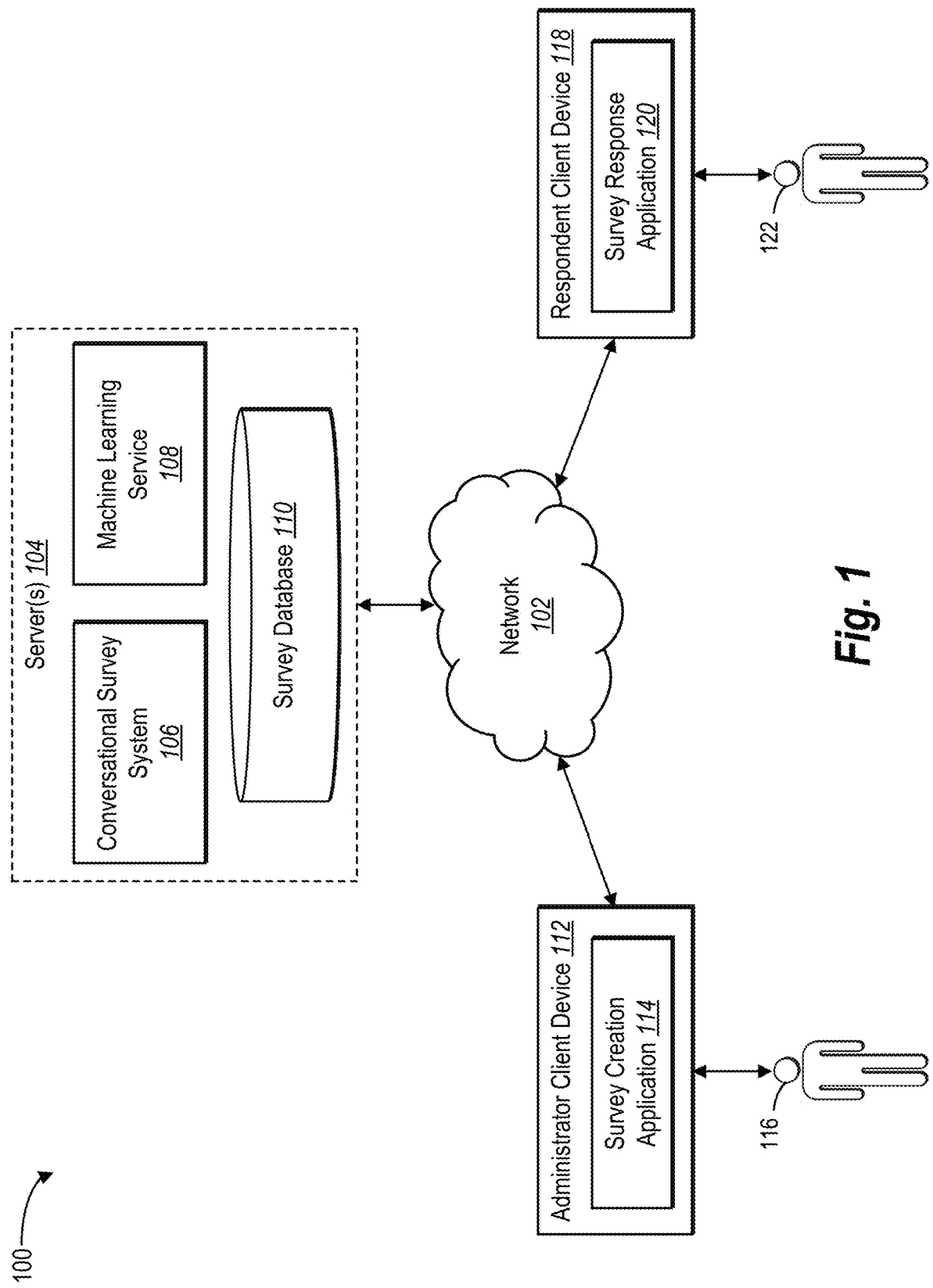
FIG. 1 illustrates a schematic diagram of an example environment of a conversational survey system in accordance with one or more embodiments.

One or more embodiments described herein provide benefits and solve one or more of the foregoing or other problems in the art with a conversational survey system. In particular, the conversational survey system can analyze a survey question response (e.g., a free-form text response) to identify topics (e.g., a person, a company, or a product) within the response. The conversational survey system can further determine a response feature (e.g., a sentiment) associated with each topic identified within the response. Based on the response feature associated with each topic, the conversational survey system can generate and provide one or more follow-up questions regarding the identified topics.

In one or more embodiments, the conversational survey system can receive a set of logic rules from an administrator client device associated with an administrator. For example, the set of logic rules can define an overall flow of an electronic survey, and in particular, can define one or more logical conditions that prompt the conversational survey system to generate a follow-up question upon detecting one or more response features and/or response topics corresponding to a logical condition. Accordingly, upon the conversational survey system receiving a response to a survey question, the conversational survey system can analyze the received response to determine a response feature of the response, a topic of the response, and/or a response feature associated with an identified topic of the response. Accordingly, the conversational survey system can generate a follow-up question to provide to the respondent client device based on applying the set of logical conditions within the survey flow to the response feature(s) and/or response topic(s) of the response.

As mentioned, the conversational survey system receives a response to a survey question associated with a digital survey. In particular, the conversational survey system receives a survey response from a respondent client device associated with a survey respondent. In addition, the conversational survey system receives a response in the form of free-form text, images, audio (e.g., voice), and/or video. Regardless of the format of the received response, the conversational survey system analyzes the received response to identify response features and/or topics within the response.

The conversational survey system also analyzes the received response. In particular, the conversational survey system may analyze text-based responses or other types of responses based on the type of survey question associated with the response. For example, the conversational survey system may analyze a survey response by implementing a machine learning model. For instance, a machine learning model may be trained to predict response features associated with a given survey response based on the text within the response. In these or other embodiments, the conversational survey system may implement other text analysis techniques to parse words, determine language, interpret tone, etc., associated with a survey response. Additional detail regarding analyzing the response is provided below in relation to the figures.

As also mentioned, the conversational survey system receives a set of logic rules from an administrator client device. In particular, the conversational survey system may provide a survey creation interface to an administrator client device whereby an administrator creates, arranges, and organizes a digital survey including survey questions and various logic rules that define sequences of survey questions as well as logical conditions that trigger the generation of follow-up questions. Accordingly, the conversational survey system generates a survey flow in response to receiving the set of logic rules from the administrator client device. The survey flow includes the logical conditions that, when triggered, cause the conversational survey system to generate and/or provide a follow-up question.

Accordingly, upon analyzing a received response, the conversational survey system identifies logical condition(s) within the survey flow that correspond with the determined response feature(s). For example, the conversational survey system may determine that a response expresses a negative sentiment toward a particular product. Accordingly, the conversational survey system may identify a logical condition that dictates that, when a negative sentiment is expressed, a follow-up question is to be generated that includes an apology and further inquiry. To illustrate, the conversational survey system may generate a follow-up question along the lines of, "We are so sorry the product was unsatisfactory. Please let us know what exactly what the problem was so we can fix it right away." Additional detail regarding generating a survey flow based on logic rules and generating follow-up survey questions is provided below in relation to the figures.

The conversational survey system described herein provides several advantages over conventional survey systems. For example, the conversational survey system is more effective than many conventional survey systems. In particular, the conversational survey system generates survey questions that are tailored to specific responses provided by a respondent, resulting in a conversation-like flow that feels more responsive, interactive, and comfortable to a respondent. Thus, the conversational survey system elicits more responses (and more informative, valuable responses) from respondents than many conventional survey systems.

As another advantage, the conversational survey system administers electronic surveys more efficiently than convention survey systems. To illustrate, the conversational survey system analyzes a response to an initial survey question, whereupon the conversational survey system identifies one or more topics and/or response features associated with the survey response. Based on the topics and/or response features, the conversational survey system generates and provides a targeted follow-up question(s) that are specifically pertinent to the received response. Therefore, the conversational survey system can collect desired information from respondents by providing a targeted set of fewer questions, rather than having to provide many more questions using the rigid survey structure of many conventional survey systems.

As another advantage, the conversational survey system described herein provides more focused, actionable information than conventional survey systems. To illustrate, the conversational survey system can identify the topic and/or response features, and, based on the identified topics and/or response features, can provide a targeted follow-up question that is customized for the respondent's particular experience (e.g., the complaint and/or endorsement the respondent provides in a free-form text response). For example, the conversational survey system can determine a sentiment (e.g., positive, negative, etc.) associated with a given response to a survey question, and the conversational survey system can further tailor a follow-up question according to the determined sentiment of the response (e.g., to directly address any issues raised in the response). Accordingly, the conversational survey system may focus on relevant issues pertaining to individual respondents rather than providing generic survey questions that are the same for each respondent across the spectrum. Thus, the conversational survey system gathers more actionable information from survey responses by inquiring about specific issues that relate to a respondent on an individual level.

Moreover, due to the focused nature of determining a focused survey question (e.g., as opposed to a generic survey question), the conversational survey system provides an improved electronic survey user interface that is more efficient that conventional interfaces. In particular, a conventional system may have to present, via a graphical user interface, numerous generic survey questions in an attempt to blindly identify a respondent's primary concern or interest with respect to an electronic survey. In contrast, the conversational survey system can generate a focused question based on a respondent's response input. Accordingly, the conversational survey system results in a user interface that can reduce or eliminate the number of user interactions necessary to gather the desired user response. For instance, instead of having to present a respondent with 20 generic electronic survey questions in a user interface, the conversational survey system can present a first question, then generate a focused survey question in response to the respondent's answer to the first question, and present the focused survey question as the second question. The reduction from 20 questions to two questions significantly improves the efficiency and usability of the user interface of the conversational survey system.

Due to the above-described technological limitations and problems of conventional electronic survey systems, the increased survey administration efficiency and the individualized and customized collection of response data on an individual basis is not possible with conventional systems. Thus, the various features, systems, processes, and methods of the conversational survey system overcome technological limitations and problems of conventional electronic survey systems that rely on a one-size-fits-all survey data structure by providing an improved electronic survey system that can specifically customize and generate survey questions in direct response to information provided in a survey response. This is a significant improvement in the field of electronic survey systems that will result in a more efficient collection of response data, higher quality of response data, and higher response rates that conventional systems have not been able to achieve.

Additionally, the conversational survey system consumes less memory and processing resources than conventional survey systems, and further requires fewer communication resources than conventional systems. In particular, by requiring fewer survey questions to collect response information, the conversational survey system may store fewer survey questions as well as fewer responses to corresponding survey questions, thereby requiring less memory and storage than conventional survey systems. Furthermore, due to generating fewer survey responses, the conversational survey system can analyze and generate survey reports while using far less processing resources compared to conventional systems that have to analyze a much larger set of survey responses. Furthermore, because the conversational survey system administers an electronic survey to a respondent more efficiently (e.g., with fewer survey questions), the conversational survey system consumes fewer communication resources than conventional systems that have to send a larger number of survey questions in an attempt to collect the same level of response data.

Additional detail regarding the conversational survey system will now be provided with reference to the figures. In particular, FIG. 1 illustrates a schematic diagram of an example environment 100 for implementing a conversational survey system in accordance with one or more embodiments. Environment 100 will be described with relation to FIG. 1 as an overview of the conversational survey system 106. Thereafter, a more detailed description of the various features, functions, components, systems, and processes of the conversational survey system 106 is provided in relation to the subsequent figures.

As illustrated in FIG. 1, the environment 100 includes a network 102, server(s) 104, a conversational survey system 106, a machine learning service 108, a survey database 110, an administrator client device 112 associated with an administrator 116, and a respondent client device 118 associated with a respondent 122. Each of the components, devices, etc., of the environment 100 may communicate via the network 102 with other components, devices, etc., of the environment 100 using an appropriate communication protocol. Alternatively, one or more of the components/devices of the environment 100 may communicate directly, bypassing network 102. For example, the conversational survey system 106 may communicate with the administrator client device 112 directly over a local connection rather than over network 102. Furthermore, although FIG. 1 illustrates a particular arrangement of the components within environment 100, and further illustrates a particular number of each component, in some embodiments the environment 100 may include more or fewer components and the environment 100 may further have an alternative arrangement of components. Additional detail regarding the various components of environment 100 is provided hereafter.

As mentioned, and as illustrated by FIG. 1, the environment 100 includes an administrator client device 112 associated with an administrator 116. As used herein, an "administrator" refers to an individual, a group of individuals, an organization, a company, or other entity that is associated with an administrator client device 112, and that creates, manages, oversees, organizes, generates, or otherwise produces a digital survey. For example, an administrator 116 can include an individual using a digital survey service (e.g., the conversational survey system 106) to create a digital survey for distribution to consumers pertaining to goods and/or services about which the administrator 116 wishes to receive feedback. Although FIG. 1 illustrates a single administrator client device 112 associated with a single administrator 116, in one or more embodiments, the environment 100 includes more than one administrator client device, each associated with one or more administrators. In this way, the conversational survey system 106 communicates (e.g., simultaneously, in tandem, iteratively, etc.) with a number of administrator client devices via network 102.

As used herein, the term "digital survey" (or sometimes simply "survey") refers to a set of digital survey questions intended for distribution over a network (e.g., network 102) by way of electronic devices (e.g., smart home devices, computers, smartphones, tablets), and further intended to collect responses to the digital survey questions for generating survey results from the collected responses. A digital survey can include one or more digital survey questions and corresponding answer choices that accompany the given question.

As used herein, a "digital survey question" (or simply "survey question") refers to a prompt included in a digital survey that invokes a response from a respondent, or that requests information from a respondent. Example types of questions include, but are not limited to, multiple-choice, slider, open-ended, ranking, scoring, summation, demographic, dichotomous, differential, cumulative, dropdown, matrix, net promoter score (NPS), singe textbox, heat map, and any other type of prompt that can invoke a response from a respondent. In one or more embodiments, when one or more answer choices are available for a digital survey question, a digital survey question may include a question portion as well as an available answer choice portion that corresponds to the survey question. For example, when describing a multiple-choice survey question, the term survey question may include both the question itself as well as the multiple-choice answers associated with the multiple-choice question.

As used herein, a "survey response" (or simply "response") refers to any type of electronic data representing a response provided to a digital survey question. Depending on the question type, the response may include, but is not limited to, a selection, a text input, an image, a voice input (e.g., a recording or a contemporaneous "live" transmission), an indication of an answer, an actual answer, and/or an attachment. For example, a response to a multiple-choice question may include a selection of one of the available answer choices associated with the multiple-choice question. As another example, a response may include a numerical value, letter, or symbol that that corresponds to an available answer choice. In some cases, a response may include a numerical value that is the actual answer to a corresponding survey question. In addition, a survey response may include other information associated thereto such as, for example, geographical information pertaining to the location of the respondent, a device ID associated with the device by which the respondent responds to the digital survey question, or other metadata associated with respondent/user input.

As used herein, a "survey result" or the term "survey results" (or simply "results") refers to a representation of information acquired from a survey response. A survey result can include a simplified representation of a sentiment, opinion, impact, effectiveness, or other information expressed by a respondent in a survey response. In particular, survey results can refer to a report of customer feedback ratings or a summary of poll results based on extracting or otherwise synthesizing quantitative and/or qualitative information from a received survey response.

Returning to FIG. 1, the environment 100 further depicts the administrator client device 112 including a survey creation application 114. In particular, the survey creation application 114 provides, to the administrator 116, by way of the administrator client device 112, an interface (e.g., a graphical user interface or "GUI") by which the conversational survey system 106 communicates with the administrator 116. In some embodiments, the survey creation application 114 can be a web-based application (e.g., a website such as a support chatroom), or alternatively, the survey creation application 114 can be a mobile application (e.g., for a tablet and/or smartphone). In particular, conversational survey system 106 can communicate with survey creation applications of various formats through various protocols to accommodate communication between the administrator client device 112 and the conversational survey system 106. Indeed, the conversational survey system 106 may provide and/or facilitate all or some of the functionality and features described below with reference to the subsequent figures via the survey creation application 114 on the administrator client device 112.

As used herein, an "administrator client device" refers to a computing device with which an administrator (e.g., administrator 116) interacts to send and receive digital communications (e.g., communicate with the conversational survey system 106). In particular, an administrator client device can include a computing device such as, for example, a desktop computer, a laptop computer, or a mobile device such as a tablet or smartphone. An administrator client device generally includes a keyboard, touchpad, touchscreen, or other user input component whereby the administrator client device receives input (e.g., interaction) from a user. In addition, the administrator client device generally includes a display screen that presents a survey creation interface or other information to an administrator via a graphical user interface. Additional detail regarding client devices generally is provided below with respect to FIGS. 15 and 16.

In one or more embodiments, the conversational survey system 106 maintains an administrator account (e.g., a paid account, a subscription account, etc.) associated with the administrator 116. For instance, the conversational survey system 106 can require the administrator 116 to register with the conversational survey system 106 to enable the administrator 116 to create, manage, organize, distribute, or otherwise utilize digital surveys. The conversational survey system 106 may also enable the administrator 116 to collect and examine results and/or responses of a digital survey to which respondents have responded. In some embodiments, the conversational survey system 106 is accessed through a generic web interface associated with a website, and a user can interact with the conversational survey system 106 without having a permanent and/or previously established relationship with the conversational survey system 106.

Additionally, the environment 100 of FIG. 1 includes a respondent client device 118 associated with a respondent 122. As used herein, a "respondent" refers to an individual, group of individuals, organization, company, or other entity associated with a respondent client device (e.g., respondent client device 118) and that participates in, responds to, or otherwise interacts with a digital survey question as part of a digital survey. For example, a respondent may refer to an individual who responds to a survey question created and distributed by the administrator 116.

As used herein, a "respondent client device" refers to a computing device operable to display a digital survey question to a respondent, and further operable to receive input from a respondent in response to the survey question. For example, a respondent client device may refer to a computing device such as a desktop computer or a laptop computer, or a respondent client device may refer to a mobile device such as a smartphone or tablet. In any case, a respondent client device may communicate with the conversational survey system 106 and/or administrator client device 112 to receive a digital survey question and to provide one or more responses to the survey question.

As illustrated in FIG. 1, the respondent client device 118 includes a survey response application 120. As used herein, the term "survey response application" refers to hardware and/or software that enables a respondent client device (e.g., respondent client device 118) to receive digital content, present digital content, receive a digital survey, present digital survey questions associated with the digital survey, receive user input for answers to digital survey questions, and provide responses to digital survey questions corresponding to the answers received via user input. A survey response application may refer to a webpage, a mobile application, a software program, executable hardware instructions, or a combination thereof. Indeed, the survey response application 120 may refer to a website or other browser-based application operable to display a user interface that includes one or more survey questions and that guides the respondent 122 through a digital survey using prompts, buttons, or other features. The survey response application 120 may alternatively refer to a mobile application operable to present a user interface and receive input from the respondent 122 pertaining to at least one digital survey question.

As illustrated in FIG. 1, the environment 100 includes server(s) 104. Additionally, the server(s) house the conversational survey system 106, the machine learning service 108, and the survey database 110. To illustrate, the server(s) 104 may include the conversational survey system 106 as well as the machine learning service 108 installed thereon as software, hardware, or both. Furthermore, the server(s) 104 may facilitate communication between the conversational survey system 106 and the machine learning service 108 directly, bypassing network 102. Indeed, in some embodiments, the conversational survey system 106 may include a machine learning service 108. In other embodiments, the conversational survey system 106 may not include a machine learning service 108, but the machine learning service 108 may instead be a standalone service provided by a third party. For instance, in these embodiments the machine learning service 108 may be housed on the server(s) 104 or else may be housed separately on other servers and may communicate with the conversational survey system 106 by way of network 102.

Additionally, as shown in FIG. 1, the server(s) 104 may include, manage, and/or maintain a digital survey database 110. Indeed, the digital survey database 110 may be located on the server(s) 104 or may be external from, but maintained by, the server(s) 104. The digital survey database 110 may be located on the server(s) 104 as one or more databases that store information for digital surveys including digital survey questions, survey responses, response features associated with responses, topics, and/or other information associated with digital surveys. Likewise, the digital survey database 110 may be located on the server(s) 104 as one or more storage locations that store sets of digital survey attributes such as digital survey identifiers and digital survey question identifiers.

Regardless of the location of the survey database 110, the survey database 110 may store information pertaining to various digital surveys. For example, survey database 110 may organize digital surveys according to survey identifiers, and may further organize survey questions within a survey by question identifiers. Additionally, the conversational survey system 106 may assign identifiers (e.g., response identifiers) to survey responses that correspond to a given survey question as well as a digital survey. Accordingly, the digital survey database 110 maintains the information for a digital survey in an organized fashion, keeping pertinent and/or related information together (e.g., via identifiers).

As mentioned, the server(s) 104 can communicate with the administrator client device 112 and/or the respondent client device 118 via network 102. In at least one embodiment, however, the conversational survey system 106 on server(s) 104, the administrator client device 112, and/or the respondent client device 118 may communicate directly, bypassing network 102. Additional detail regarding the network 102 and server(s) 104 is described below with reference to FIGS. 15 and 16.

Although FIG. 1 depicts a particular arrangement of the conversational survey system 106, the machine learning service 108, the survey database 110, the administrator client device 112, and the respondent client device 118, additional or alternative arrangements are possible. For example, in some embodiments the conversational survey system 106 includes the machine learning service 108 thereon, while in other embodiments the machine learning service 108 is associated with a third party and may therefore by located apart from the conversational survey system 106 and the server(s) 104. Additional detail regarding the conversational survey system 106 and its operation is provided hereafter with reference to the subsequent figures.

As mentioned above, the conversational survey system 106 performs a number of acts or operations to provide a conversation survey to a respondent client device 118. To illustrate the operation of the conversational survey system 106, FIG. 2 provides a sequence flow diagram 200 depicting a sequence of acts that the conversational survey system 106 performs to generate and provide a conversational digital survey.

In particular, the sequence flow diagram 200 includes acts 202-218 performed by one or more of the machine learning service 108, the conversational survey system 106, and the respondent client device 118. The sequence flow diagram 200 further illustrates the interaction between the machine learning service 108, the conversational survey system 106, and the respondent client device 118. As discussed above with reference to FIG. 1, and as illustrated by the dashed lines shown in FIG. 2, the server(s) 104 can include a single server or server system that hosts both the machine learning service 108 and the conversational survey system 106. Alternatively, the machine learning service 108 and the conversational survey system 106 can be operated on separate servers and/or separate server systems. Additionally, although the acts 202-218 of the sequence flow diagram 200 of FIG. 2 are shown in a particular order and are each respectively performed by a particular device and/or system, in some embodiments, one or more of the acts 202-218 can be performed in a different order and/or by a different device and/or system.

Figure 2:
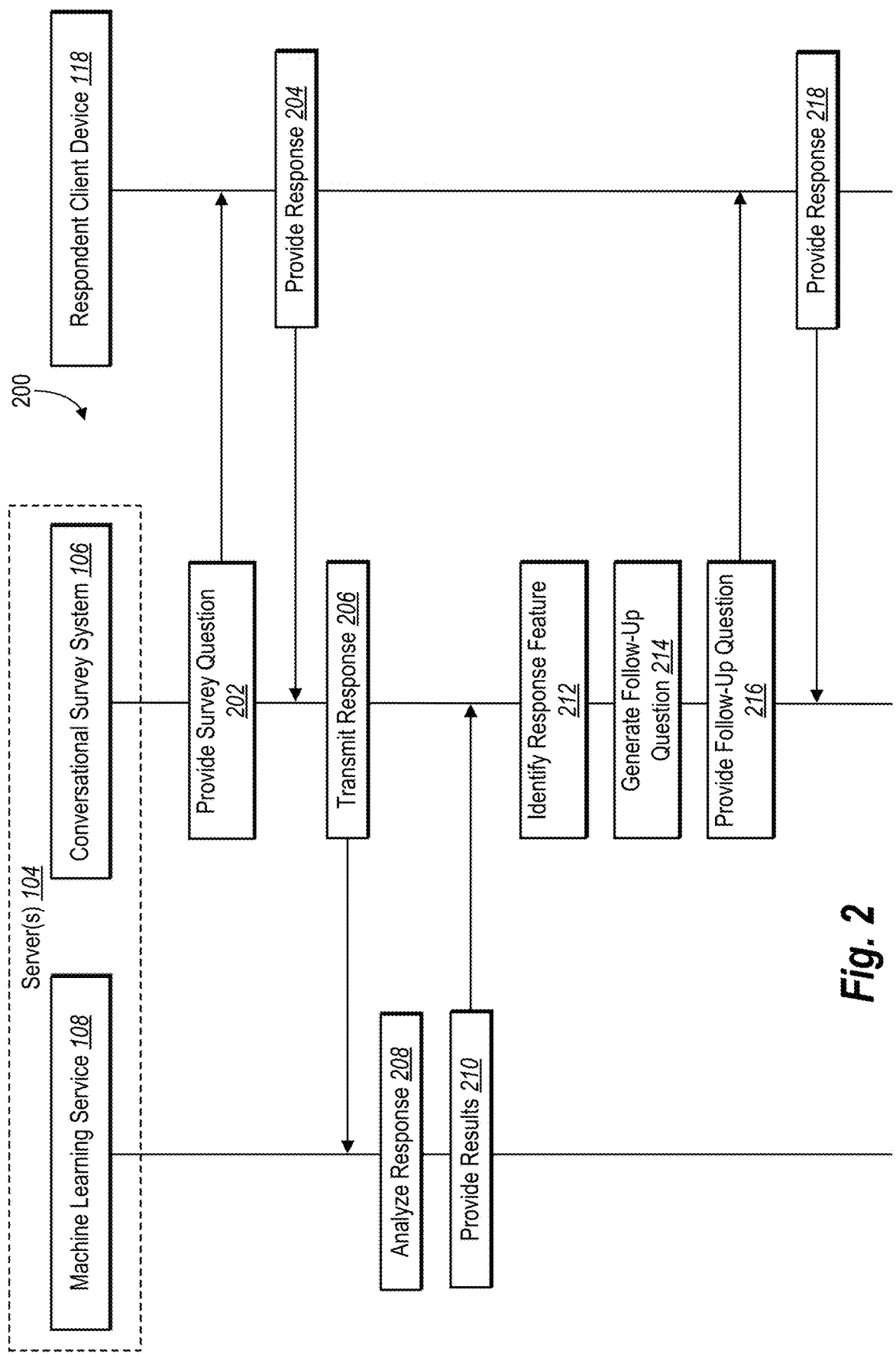
FIG. 2 illustrates a sequence diagram for analyzing a survey response and generating conversational survey questions in accordance with one or more embodiments.

Although not illustrated in FIG. 2, the conversational survey system 106 may provide, by way of the survey creation application 114 to the administrator client device 112, a GUI whereby the administrator 116 can input or otherwise create a set of logic rules associated with a digital survey. As used herein, a "logic rule" refers to a digital logic statement. In particular, a logic rule can refer to a computerized logic statement that defines a rule based on various factors and/or triggers. In addition, the conversational survey system 106 can receive the set of logic rules from the administrator client device 112 in turn. Additional information regarding the GUI on the administrator client device 112 and the logic rules is provided below with reference to FIGS. 5-7.

Based on the logic rules, the conversational survey system 106 generates a survey flow. As used herein, the term "survey flow" refers to a digital mapping of survey questions. In addition, a survey flow can refer to a mapping of logical conditions that, when triggered, cause the conversational survey system 106 to generate and/or provide a new survey question as part of a digital survey. For example, a survey flow can include a number of logical conditions that each correspond to a logic rule defined by the administrator 116 and that define when to provide a survey question to a respondent client device. As used herein, the term "logical condition" (or simply "condition") refers to a condition of a digital survey defined by a logic rule. In particular, a logical condition can refer to an event or occurrence that triggers a subsequent action by a conversational survey system 106. Indeed, the survey flow can define the logical conditions that govern the delivery of survey questions to respondent client devices based on received responses and the logic rules set by the administrator 116. Additional information regarding the survey flow and the logical conditions is provided below with reference to FIG. 8.

As illustrated in FIG. 2, the conversational survey system 106 performs act 202 based on the generated survey flow to provide a survey question to the respondent client device 118. For instance, the conversational survey system 106 receives input from the administrator client device 112 to create and distribute a digital survey including a survey question. The act 202 can further include the acts described above regarding providing the GUI to the administrator client device 112 whereby the administrator 116 defines a set of logic rules to govern a digital survey, receiving logic rules from the administrator client device 112, and generating the survey flow based on the logic rules. In either case, the conversational survey system 106 communicates with the respondent client device 118 as described above in relation to FIG. 1 to provide the survey question to the respondent client device 118.

As also illustrated in FIG. 2, the respondent client device 118 performs act 204 to provide a response to the survey question to the conversational survey system 106. In particular, the respondent client device 118 receives input from the respondent 120 in the form of free-form text, image(s), audio, etc., to create a response to the survey question. The respondent client device 118 then provides the response to the conversational survey system 106 in accordance with the communication described above in relation to FIG. 1, and in more detail below in relation to FIGS. 12 and 13.

As further illustrated in FIG. 2, the conversational survey system 106 receives the response from the respondent client device 118 and performs act 206 to transmit the response to the machine learning service 108. In particular, the conversational survey system 106 communicates with the respondent client device 118 and the machine learning service 108 to receive the response from the respondent client device 118 and to transmit the response to the machine learning service 108 in accordance with the communications described above.

As further illustrated in FIG. 2, the machine learning service 108 receives the response from the conversational survey system 106. The machine learning service 108 performs the act 208 to analyze the response. In particular, the machine learning service 108 analyzes the response by implemented a trained machine learning model such as, for example, a neural network (e.g., a convolutional neural network), parsing text, natural language processing and/or determining various attributes associated with the response. As used herein, the term "machine learning model" refers to a computer representation that can be tuned (e.g., trained) based on inputs to approximate unknown functions. In particular, the term machine-learning model can include a model that utilizes algorithms to learn from, and make predictions on, known data by analyzing the known data to learn to generate outputs that reflect patterns and attributes of the known data. For instance, a machine-learning model can include, but is not limited to, a neural network (e.g., a convolutional neural network or deep learning), decision tree, association rule learning, inductive logic programming, support vector learning, Bayesian network, regression-based model, principal component analysis, or a combination thereof.

As mentioned, in one or more embodiments, the conversational survey system 106 trains a machine learning model with training data. As used herein, the term "training" refers to information utilized to train (e.g., tune or teach) a machine learning model. Thus, a training survey response or a training text refers to a survey response or other text used to train a machine learning model. Likewise, a training image refers to a digital image utilized to train a machine learning model. In some embodiments where the response is a text-based response, the machine learning service 108 analyzes the text, whereas in other embodiments where the response is an image or audio recording, the machine learning service 108 analyzes the images and/or audio to determine various attributes associated thereto. Additional details regarding the machine learning service 108 is provided below.

As illustrated in FIG. 2, the machine learning service 108 may analyze the response regardless of misspelled words, bad grammar, misused punctuation, use different (e.g., multiple) languages, etc. Based on using a trained machine learning model, the machine learning service 108 may determine various characteristics associated with the response.

As used herein, the term "characteristics" refers to traits associated with a survey responses. In particular, characteristics can refer to traits that are expressly shown in a survey response. For example, characteristics can include the text of a survey response, a string of characters in a response, words used a response, sentence structure of a response, and/or phraseology of a survey response. Accordingly, characteristics can refer to topics found within a survey response. A "topic" refers to a subject, object, or other noun identified within a response. For example, a topic may refer to an entity, individual, company, product, etc. In addition to topics, characteristics can relate to response features associated with a survey response. For instance, using certain words can indicate a certain attitude toward something, thereby reflecting a sentiment toward a particular product, for example.

Indeed, as used herein, the term "response feature" refers to features explicit within or inherent to a survey response. In particular, a response feature can refer to conclusions drawn by analyzing characteristics within a survey response. For example, a response feature may include a sentiment associated with a response, a salience of a response, a magnitude of a response, a language used in a response, a length of a response (e.g., a number of characters, a number of sentences, a number of characters per sentence, etc.). A response feature may refer to a feature, characteristic, or attribute of a response, or else a response feature may refer to a feature or characteristic of another characteristic of the response. For example, sentiment may refer to an overall sentiment of a response as a whole, or else may refer to a sentiment associated with a particular topic (e.g., entity) identified within the response.

A "sentiment" may refer to an opinion, feeling, or attitude. In particular, a sentiment can reflect a feeling towards a particular topic (e.g., entity, object, product, etc.), and can be represented by a sentiment score or rating. For example, a sentiment may be a rating assigned to an overall response or a specific topic on a scale from −1 to 1 (e.g., −0.8, −0.2, 0.1, 0.8, etc.), where more negative sentiments correlate to more negative opinions and more positive sentiments correlate to more positive opinions. Additionally, a response feature can include a magnitude. As used herein, the term "magnitude" reflects an effort that a respondent (e.g., respondent 122) goes through to provide a survey response, and may be represented by a magnitude score or rating. For example, a magnitude may refer to a length of a response, a composition time of a response, an input type of a response (e.g., text, image, voice, etc.), or a combination thereof. For instance, a magnitude may refer to a score to reflect a number of characters or length of a portion of a response pertaining to a particular entity. A magnitude may be on a scale from 0 to 100 (or some other fixed scale) or else may be an open-ended rating that correlates to an amount of effort expended to express an opinion relating to a particular entity.

Returning to FIG. 2, the machine learning service 108 provides results from the analysis of the response to the conversational survey system 106, as illustrated by act 210 of FIG. 2. As described above, the machine learning service 108 communicates with the conversational survey system 106 via network 102 (or otherwise) to provide the results of the analysis. Additional detail regarding the analysis of the response and the determination of response features is provided below with reference to the subsequent figures.

Furthermore, the conversational survey system 106 identifies a response feature associated with the analyzed response, as illustrated by act 212 of FIG. 2. In particular, the conversational survey system 106 may identify the response feature as the output from a machine learning model associated with the machine learning service 108. Indeed, the machine learning service 108 can generate predicted response features from a survey response, as will be described in further detail below with reference to FIGS. 3 and 4. In some embodiments, the machine learning service 108 may provide more than one response feature, whereupon the conversational survey system 106 performs act 212 to identify one or more of the response features.

The conversational survey system 106 may further identify topics within a survey response. Indeed, the conversational survey system 106 can identify more than one topic (e.g., entity) within a given response, and can further determine a type associated with each topic. A type can include types such as "person," "product," "service," "company," or some other relatively broad category of topic. Based on the type of the topic, the conversational survey system 106 can generate a follow-up question pertaining to that topic type (in addition to other factors described in further detail below).

Indeed, as further illustrated in FIG. 2, the conversational survey system 106 performs act 214 to generate a follow-up question. As used herein, a "follow-up question" refers to a survey question that the conversational survey system 106 provides to follow up a received survey response. In particular, a follow-up question can refer to a survey question that the conversational survey system 106 generates based on the survey flow associated with the digital survey. More specifically, a follow-up question can include a survey question that the conversational survey system 106 generates in response to detecting or determining that a logical condition within the survey flow has been met, satisfied, or otherwise triggered.

Indeed, to perform act 214, the conversational survey system 106 compares the identified response feature with the survey flow to identify which logical condition within the survey flow is triggered. For example, upon identifying a negative sentiment associated with a particular product (act 212), the conversational survey system 106 may determine that a logical condition associated with the particular product is triggered by the survey response. Since the sentiment toward the product is negative, the conversational survey system 106 may generate a follow-up question that is different from a potential follow-up question that the conversational survey system 106 would otherwise generate if the sentiment were positive (e.g., as dictated by the survey flow).

To illustrate, because of the negative sentiment, the conversational survey system 106 may generate a follow-up question that includes an apology (e.g., "We are so sorry product A was unsatisfactory."). On the other hand, if the conversational survey system 106 identifies a positive sentiment toward a particular topic, the conversational survey system 106 may generate a follow-up question that includes a thank-you message ("We are so glad you enjoyed product A."). In either case, based on determining which logical condition is triggered within the survey flow, the conversational survey system 106 generates a follow-up question that matches the logical condition.

As mentioned, the conversational survey system 106 can combine response features to generate a follow-up question. In particular, the conversational survey system 106 can consider sentiment and magnitude together, in accordance with the survey flow. In other words, based on the logic rules that the administrator 116 provides to define the survey flow, the conversational survey system 106 determines what factors go into generating a follow-up question. As an example, the conversational survey system 106 may determine that a sentiment of a response is −0.4 (on a scale from −1 to 1), and the conversational survey system 106 may further determine that the magnitude of the response is 60 (on a scale from 1 to 100). In addition, the conversational survey system 106 may combine the sentiment and the magnitude together in accordance with the survey flow. Indeed, the administrator 116 defines how to calculate an overall response score such as, for example, by multiplying the scores for two or more response features together, adding the scores together, averaging the scores, normalizing the scores, or by combining the scores in some other way.

Thus, in the example, the conversational survey system 106 may calculate an overall response score of −24 (e.g., by multiplying −0.4*60=−24). In addition, the conversational survey system 106 may determine that the overall score (−24) is within a particular range of overall scores, and may generate a follow-up question that corresponds to the particular range of scores. To elaborate, the logic rules received from the administrator client device 112 may define various score ranges, and may further define corresponding follow-up questions that associate with each of the ranges.

Continuing the above example, as a result of the overall score of −24, the conversational survey system 106 generates a follow-up question that includes an apology. For instance, the conversational survey system 106 may generate a follow-up survey question such as, "We are sorry that product A did not meet your expectations. What exactly was the problem with it?" Indeed, based on the negative sentiment, the conversational survey system 106 may generate a follow-up survey question that includes an apology and that further inquires into the reasons for the negative sentiment. Thus, the conversational survey system 106 is more effective than conventional systems at narrowing in on problems and finding solutions by doing so in fewer respondent interactions.

Furthermore, the conversational survey system 106 may generate follow-up survey questions based on gradations of overall scores (e.g., based on variations of sentiment, magnitude, or other response features). For instance, a respondent may provide a survey response that reflects a more negative sentiment than the overall score of −24 described above. To elaborate, a respondent may use profanity or other language that expresses a very negative sentiment such as a score of −0.9 or a −1. Additionally, the response may be very wordy which results in a magnitude of 90 or 100. Thus, the overall score for this response may be −0.9*90=−89. In this case, the conversational survey system 106 may generate a follow-up question that differs from the follow-up question described above in relation to the score of −24.

More specifically, the conversational survey system 106 may generate a follow-up question that includes an action statement—i.e., a statement that indicates that the party in charge of the mistake or whomever is responsible for the negative sentiment will be informed. For example, the conversational survey system 106 may generate a follow-up question that includes a statement such as, "We will notify the manufacturer that product A was defective right away," in addition to (or alternatively to) the apology.

Indeed, the conversational survey system 106 may generate different survey questions based on the range of the overall score associated with the survey response. In addition, not every response feature may necessarily have a corresponding follow-up question. For example, the conversational survey system 106 may determine that some response features are less important and do not therefore trigger a subsequent follow-up survey question. For instance, the conversational survey system 106 can determine that topics whose sentiment score is within a certain threshold do not result in a follow-up question. To illustrate, some respondents may indicate ambivalence or a minor feeling toward a particular product, service, or entity. In these cases, the conversational survey system 106 may determine (in accordance with the survey flow), that no follow-up question is necessary, and may therefore refrain from generating such a follow-up question.

As part of generating a follow-up question, the conversational survey system 106 can customize the follow-up question based on a detected topic. For example, the follow-up question can reference a detected topic as part of the follow-up question. To illustrate, based on determining the response included a positive sentiment with respect to Product A, the conversational survey system 106 can customize a follow-up question to include a reference to the Product A. For instance, the conversational survey system 106 may generate the follow-up question of "We are glad that you like Product A. What is your favorite feature of Product A?" As mentioned above, such a follow-up question is not pre-programed to be delivered to the respondent, but rather, the conversational survey system 106 generates the follow-up question based on the analysis of a response.

Upon generating a follow-up question, the conversational survey system 106 performs act 218 to provide the follow-up question to the respondent client device 118. In particular, the conversational survey system 106 communicates with the respondent client device 118 as discussed above to provide the follow-up question. In response to receiving the follow-up question, the respondent client device 118 provides a response to the follow-up question, as depicted by act 220 of FIG. 2. The sequence of acts shown in sequence flow diagram 200 may repeat with each successive follow-up question until the conversational survey system 106 reaches an end of a survey flow such as, for example, asking a single follow-up question for every topic identified within an initial response. In other embodiments, the conversational survey system 106 may continue to ask follow-up questions until the respondent 120 stop providing responses, or else the conversational survey system 106 may analyze each response to determine an information score associated with each identified topic and, upon determining that the information score for a given topic meets or exceeds a threshold, may cease providing follow-up questions about that entity and may provide follow-up questions about another entity until each entity's information score meets a threshold.

In other embodiments, the conversational survey system 106 ceases to provide additional follow-up questions (or terminate the electronic survey) based on reaching the end of a survey flow as dictated by the set of logic rules. For example, the conversational survey system 106 may terminate administration of a survey based on administering a predefined number of survey questions. In additional embodiments, upon completing a survey flow, the conversational survey system 106 my serve a generic question asking of the respondent 122 would like to answer any more questions, and based on the response received to the generic question, the conversational survey system 106 either sends the next survey question of the electronic survey, or terminates the electronic survey.

Figure 3:
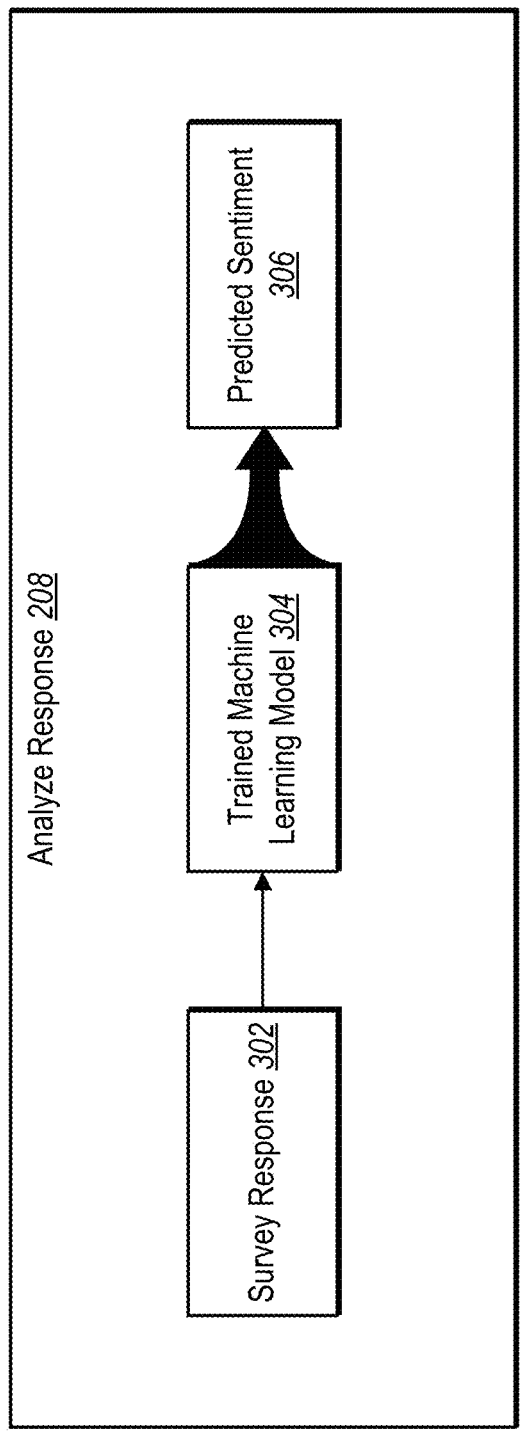
FIG. 3 illustrates an example flow for implementing a trained machine learning model to generate predicted response features in accordance with one or more embodiments.

As mentioned above, the conversational survey system 106 utilizes a machine learning model to analyze a survey response. Whether by a third-party machine learning service or by a machine learning service local on the server(s) 104, the conversational survey system 106 utilizes a trained machine learning model to determine various response features from the text of a survey response. FIG. 3 illustrates a more detailed view of act 208 from the sequence flow diagram 200, including various acts therein.

As illustrated in FIG. 3, the act 208 of analyzing a response includes a trained machine learning model 304 to predict or determine response features associated with a given survey response 302. While the machine learning service 108 may analyze a survey response 302 to determine any of a number of response features, the following example relates to a sentiment associated with the survey response 302. In particular, the machine learning service 108 inputs the survey response (e.g., the received survey response) 302 into the trained machine learning model 304.

Based on the training of the machine learning model 304, the machine learning model 304 analyzes the text of the survey response 302. As described above, a machine learning model is a predictive model that takes a set of input data and, based on a set of training data by which the model is trained, predicts an outcome for the input data. As shown in FIG. 3, the trained machine learning model 304 may be trained to recognize certain words, phrasings, expressions, languages, etc., from the survey response 302.

Indeed, as further illustrated in FIG. 3, the trained machine learning model 304 analyzes the survey response 302 to predict the sentiment that is most likely expressed by the survey response 302. In particular, the trained machine learning model 304 outputs a predicted sentiment 306. To elaborate, the predicted sentiment 306 is the sentiment that the trained machine learning model 304 determines most closely represents the words, expressions, phrasings, etc., of the survey response 302. In some embodiments, the trained machine learning model 304 outputs one or more other response features as well, such as salience, magnitude, etc., as described above.

As also described above, the conversational survey system 106 can generate the predicted sentiment 306 by way of the trained machine learning model 304 as pertaining to a particular topic. In particular, the conversational survey system 106 can analyze the survey response 302 to generate multiple predicted sentiments within a single response, where each sentiment corresponds with a different identified topic. Indeed, a single survey response may include a positive remark for one topic and a negative remark for another topic. Thus, the conversational survey system 106 may implement the trained machine learning model 304 to predict a sentiment with regard to each individual topic within the survey response 302.

Figure 4:
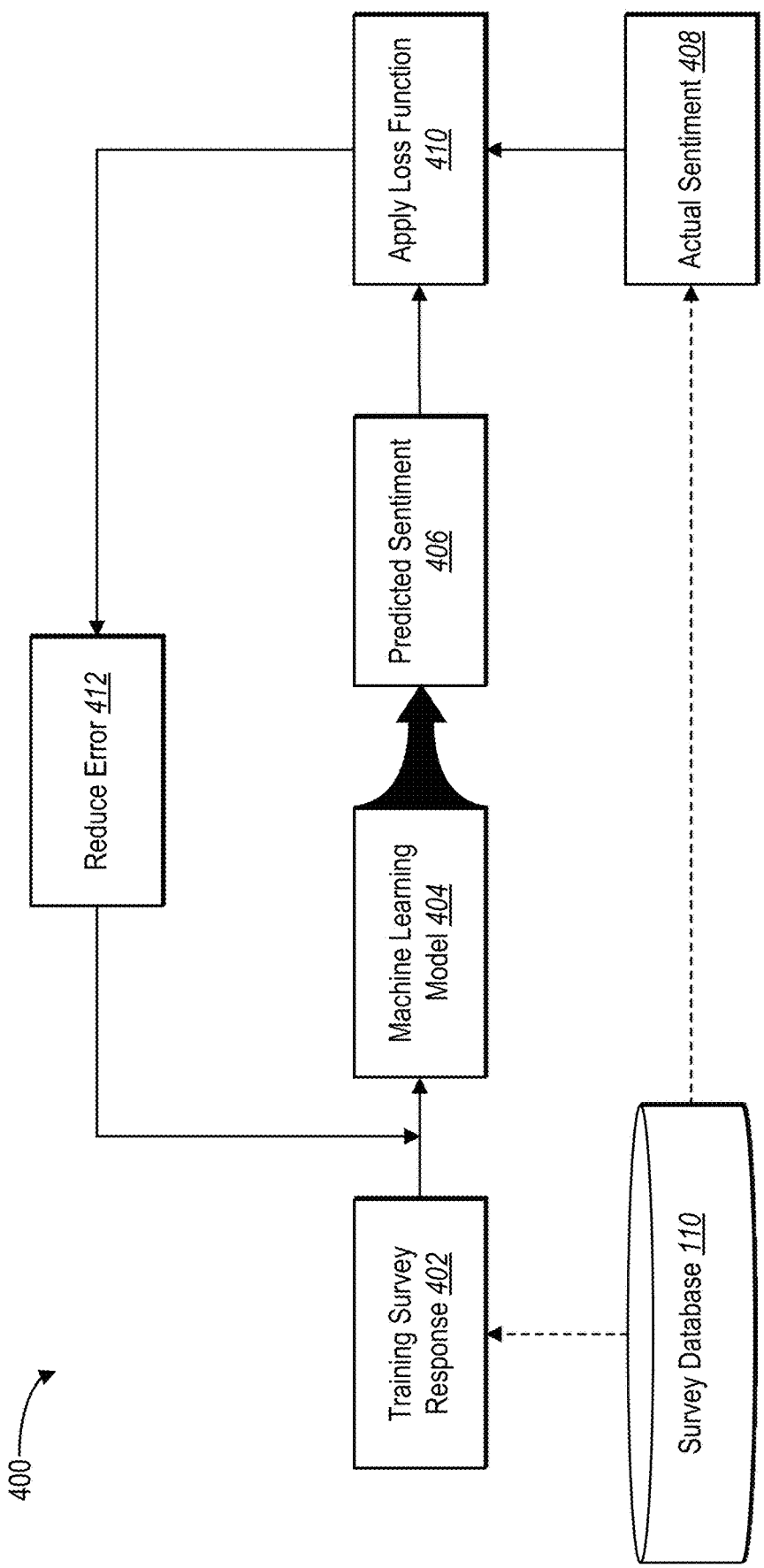
FIG. 4 illustrates an example flow for training a machine learning model in accordance with one or more embodiments.

As mentioned, the conversational survey system 106 trains the machine learning model 304 by way of the machine learning service 108. FIG. 4 illustrates a flow 400 including various acts involved in training a machining learning model. The machine learning model 404 in FIG. 4 may be the machine learning model as the trained machine learning model 304 of FIG. 3, only in a state before being trained. Like FIG. 3, the discussion pertaining to FIG. 4 involves training the machine learning model 404 to predict a sentiment score. However, it will be understood from the disclosure herein that the conversational survey system 106 can train the machine learning model 404 to predict any of the above-mentioned response features.

As illustrated in FIG. 4, the conversational survey system 106 accesses a survey database 110 that includes a training survey response 402 and a corresponding actual sentiment 408. In particular, the survey database 110 stores a set of training data that includes the training survey response 402 and the known sentiment score associated with the training survey response 402. Indeed, the survey database 110 may include a number of training survey responses and their corresponding sentiment (or other response feature) scores.

As shown, the conversational survey system 106 trains the machine learning model 404 by inputting the training survey response 402 into the machine learning model 404, whereupon the machine learning model 404 generates the predicted sentiment 406. The conversational survey system 106 compares the predicted sentiment 406 with the actual sentiment 408 associated with the training survey response 402.

In particular, to compare the predicted sentiment 406 with the actual sentiment 408, the conversational survey system 106 performs act 410 to apply a loss function. By applying the loss function (act 410), the conversational survey system 106 determines a measure of loss (e.g., a difference or measure of error) between the predicted sentiment 406 of the training survey response 402 and the actual sentiment 408 of the training survey response 402. For example, the conversational survey system 106 may apply any of a number of appropriate loss functions such as a Bayesian loss function, a risk function, a quadratic loss function, or a utility loss function.

As shown, the conversational survey system 106 trains the machine learning model 404 based on determined loss (or error) between the predicted sentiment 406 and the actual sentiment 408. In particular, the conversational survey system 106 performs act 412 to reduce the error generated by the loss function. For instance, the conversational survey system 106 can modify parameters of the machine learning model 404 to reduce the difference between the predicted sentiment 406 and the actual sentiment 408. To illustrate, in one or more embodiments the conversational survey system 106 performs one of a number of error reduction techniques such as mean squared error reduction or standard error reduction.

Furthermore, the conversational survey system 106 repeats the process illustrated by the flow 400. Indeed, the conversational survey system 106 can identify a second training survey response from the survey database 110, generate a second predicted sentiment, compare the second predicted sentiment with a second actual sentiment by applying a loss function, and reduce the error between the second predicted sentiment and the second actual sentiment. The conversational survey system 106 can repeatedly train the machine learning model 404 utilizing a plurality of different training survey responses. As the conversational survey system 106 repeats the process of flow 400, the predicted sentiment 406 becomes more and more accurate—i.e., closer to the actual sentiment 408.

By training the machine learning model 404 in this way, and then applying the trained machine learning model 304 of FIG. 3 to a survey response 302, the conversational survey system 106 produces a predicted sentiment 306 that represents the attitude, feeling, and/or opinion of the respondent 122 as expressed in the survey response 302.

Figure 5:
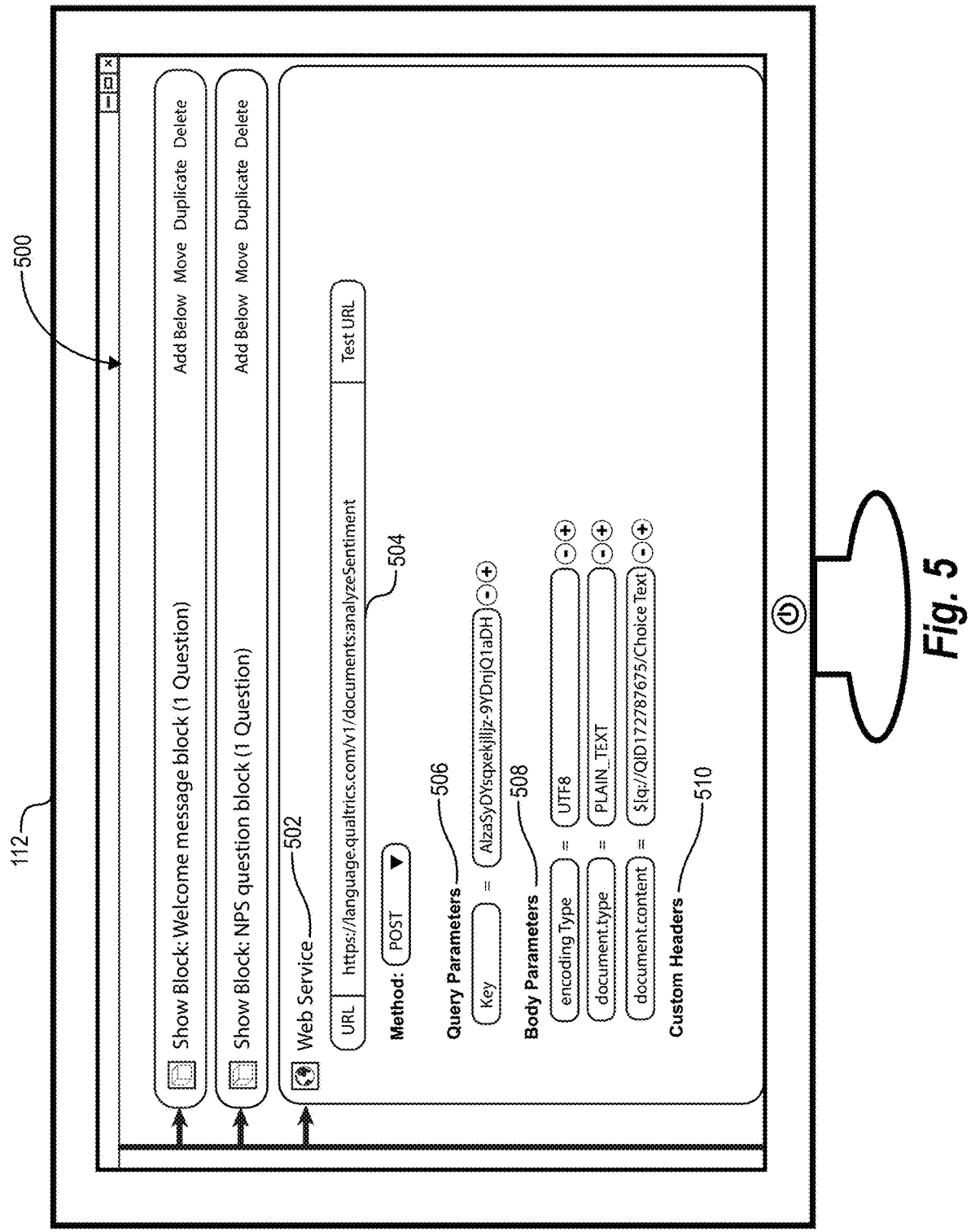
FIG. 5 illustrates an example interface for creating a digital survey based on a set of logic rules in accordance with one or more embodiments.

As mentioned above, to solicit a survey response, the conversational survey system 106 provides a GUI to the administrator client device 112, whereby the administrator 116 can enter parameters and create logic rules to generate a digital survey. Indeed, FIG. 5 illustrates an example administrator client device 112 displaying a GUI 500 that includes a number of parameters and settings for generating a digital survey.

As shown, the conversational survey system 106 enables the administrator 116 to create survey questions and furthers enable the administrator 116 to define settings such as a setting to call one or more application programming interfaces ("APIs") associated with machine learning services.

By way of the GUI 500, the conversational survey system 106 enables the administrator 116 to incorporate one or more machine learning services (e.g., machine learning service 108) to analyze responses to survey questions. In particular, the GUI 500 includes parameters whereby the administrator 116 can select a web service 502. The web service 502 can refer to the machine learning service 108 that includes a machine learning model, as described above.

As mentioned, the web service 502 may refer to web services such as machine learning service 108. For instance, the GUI 500 includes a URL bar 504 wherein the administrator 116 enters a URL of a machine learning service 108 such as, for example, a GOOGLE API, an IBM WATSON API, or other machine learning API. Furthermore, the GUI 500 includes query parameters 506 by which the administrator 116 sets a query parameter for the machine learning service 108.

The GUI 500 also includes body parameters 508 for the administrator 116 to set parameters such as encoding type, document type (e.g., plain text, PDF, etc.), and/or document content. The body parameters 508 may define various settings that the machine learning service 108 will utilize when analyzing a response to more quickly or more effectively recognize a format, type, and/or content of the input within the response (e.g., text, images, audio recordings, etc.).

In addition, the GUI 500 includes custom headers 510. The custom headers 510 define particular characteristics associated with response features and topics which the conversational survey system 106 identifies within a response. For example, the custom headers 510 may cause the conversational survey system 106 to call various functions or methods from within the API listed in URL bar 504 to, for example, identify a language in which a response is typed, identify each entity within the response, determine a sentiment associated with each entity, etc.

Figure 6:
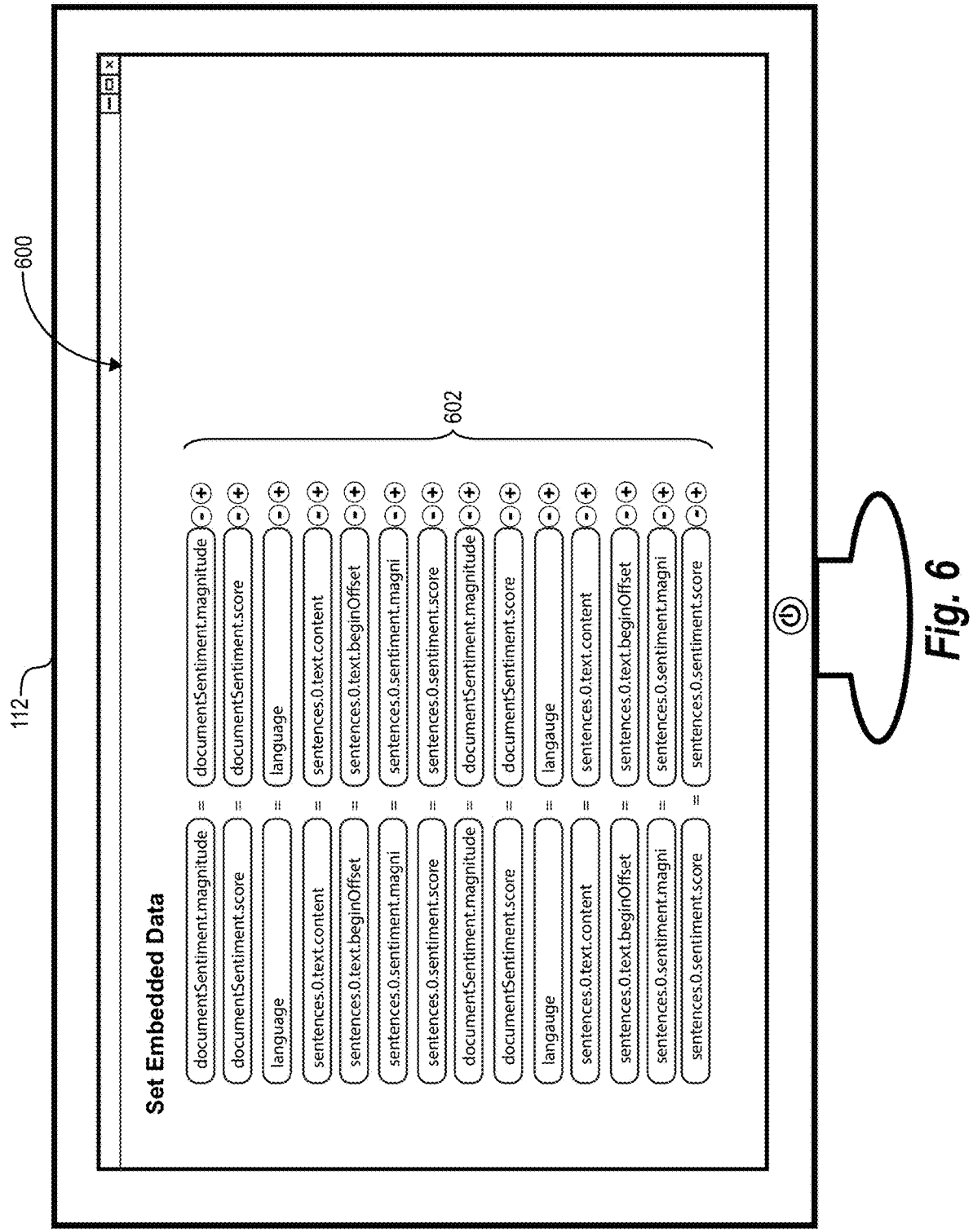
FIG. 6 illustrates an example interface for setting custom headers associated with a digital survey in accordance with one or more embodiments.

Continuing the discussion of custom headers 510 to FIG. 6, FIG. 6 illustrates the administrator client device 112 displaying a GUI 600 that includes a set 602 of custom headers. The conversational survey system 106 enables the administrator 116 to set one or more custom headers which call methods associated with the machine learning service 108. For instance, the set 602 of custom headers may define which characteristics, and therefore which response features and topics, the conversational survey system 106 will identify within, or determine from, a particular response.

As illustrated in FIG. 6, the conversational survey system 106 may call API methods to determine response features such as magnitude (e.g., an overall magnitude or a topic-specific magnitude), sentiment (e.g., an overall sentiment or a topic-specific sentiment), as well as other characteristics of the response such as the language of the response, topics (e.g., entities), etc.

In some embodiments, as shown in FIG. 6, some response features may be associated with other response features. For example, a given magnitude may be associated with a particular sentiment of a particular entity identified within a response—i.e., the magnitude may define a magnitude, scale, or intensity of the sentiment toward that entity.

Figure 7:
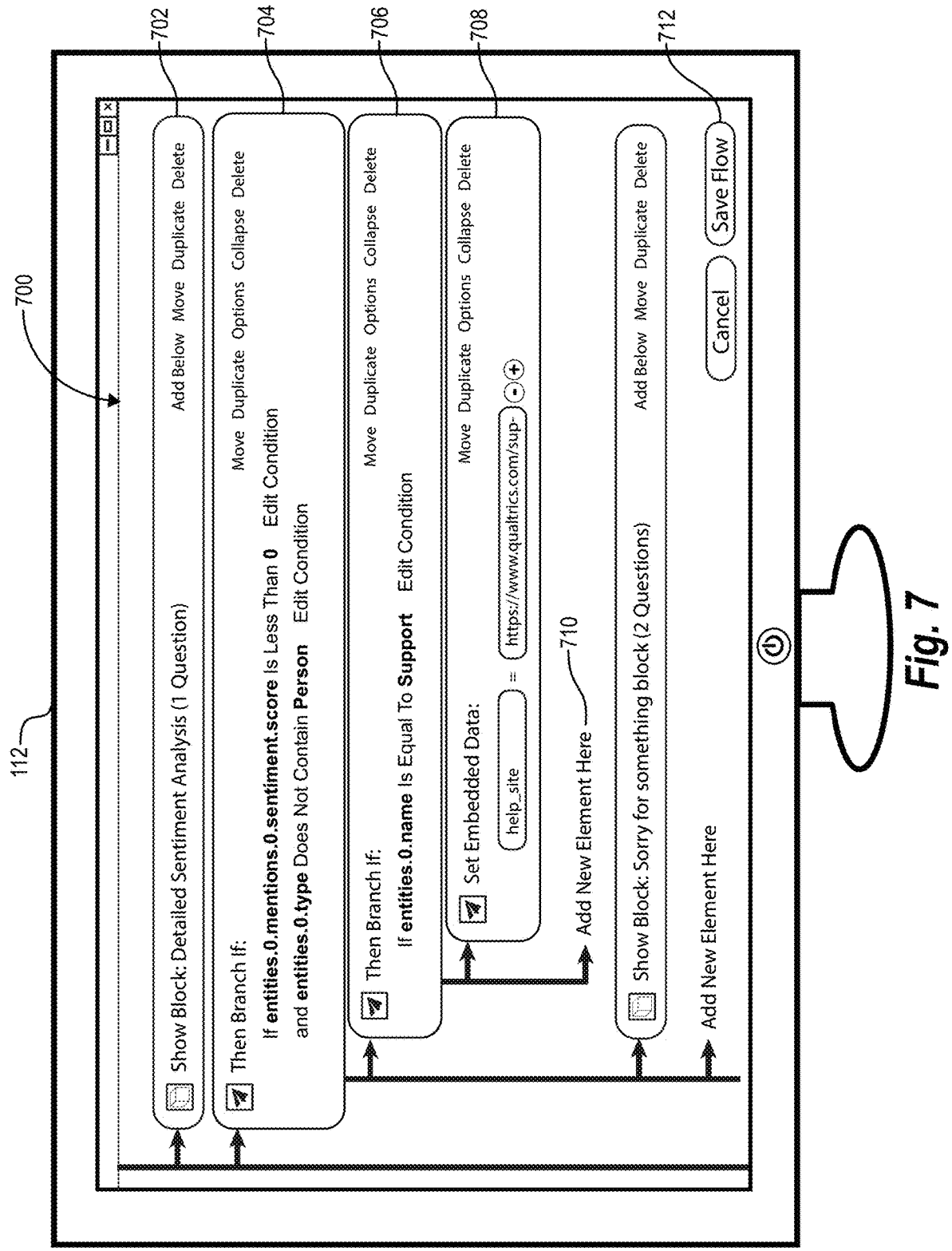
FIG. 7 illustrates an example interface for creating logic rules in accordance with one or more embodiments.

As mentioned above, the conversational survey system 106 further provides a GUI to the administrator client device 112 whereby the administrator 116 enters logic rules to define a survey flow for a digital survey. Indeed, FIG. 7 illustrates the administrator client device 112 displaying a GUI 700 that includes a number of elements 702-712. In particular, the elements 702-712 are part of a logic flow and help the administrator 116 create logic rules for a digital survey.

As shown, the set of logic rules may define an order that the conversational survey system 106 provides survey questions to a respondent client device 118. For example, the conversational survey system 106 may provide an initial survey question to the respondent client device 118, whereupon the respondent 122 may provide a response. The conversational survey system 106 analyzes the response (e.g., by way of the machine learning service 108) and generates a follow-up question based on the analysis of the response and in accordance with the logic rules. As will be described in further detail below with reference to FIG. 8, the conversational survey system 106 generates a survey flow based on receiving the set of logic rules created by way of the GUI 700.

The logic rules of GUI 700 define the various cases and circumstances to which the conversational survey system 106 can react to provide follow-up questions. For instance, in some cases, the conversational survey system 106 may provide a first follow-up question based on determining that the respondent 122 conveyed a negative sentiment toward a particular topic, while in other cases the conversational survey system 106 may provide a second follow-up question based on determining that the respondent 122 conveyed a positive sentiment toward another topic.

As illustrated in FIG. 7, the GUI 700 depicts a collapsed block element 702 that contains logic rules therein and that, when expanded (e.g., selected by the administrator 116), will display the logic rules within. FIG. 7 further includes conditional logic rule elements 704-708 that define how the conversational survey system 106 will respond given a particular set of conditions identified from a response.

To illustrate, and as illustrated in FIG. 7, the set of logic rules may include nested conditional logic statements such as if-then statements. In particular, logic rule element 704 may include an if-then statement that causes the conversational survey system 106 to operate based on a logical condition where, for example, if the conversational survey system 106 determines that a response includes a sentiment less than 0 and the type of entity is not a person, then the conversational survey system 106 continues to the logical condition depicted by logic rule element 706 to further determine if the entity name is "support." If the entity name is support, then the conversational survey system 106 continues to the logical condition associated with the logic rule element 708 that indicates to provide a help site to the respondent client device 118 in the form of a link.

The administrator 116 may change the logic rules, add logic rules (e.g., by way of element 710), remove logic rules, and/or otherwise alter the set of logic rules associated with a digital survey. As mentioned, the conversational survey system 106 applies the logic rules to generate a survey flow that includes logical conditions that correspond to the logic rules. Accordingly, if a response does not include a topic and/or response feature that matches a logic rule for a particular survey question, then the conversational survey system 106 can continue to the next question within the electronic survey.

As illustrated from FIG. 7, the GUI 700 further includes a save flow option 712. In particular, the save flow option 512 enables the administrator 116 to save the set of logic rules. Based on the administrator 116 saving the logic rules, the conversational survey system 106 associates the set of logic rules to a given digital survey (e.g., by way of a survey identifier) to allow the conversational survey system 106 to apply the set of logic rules to received responses based on topics and response features of the received responses.

Figure 8:
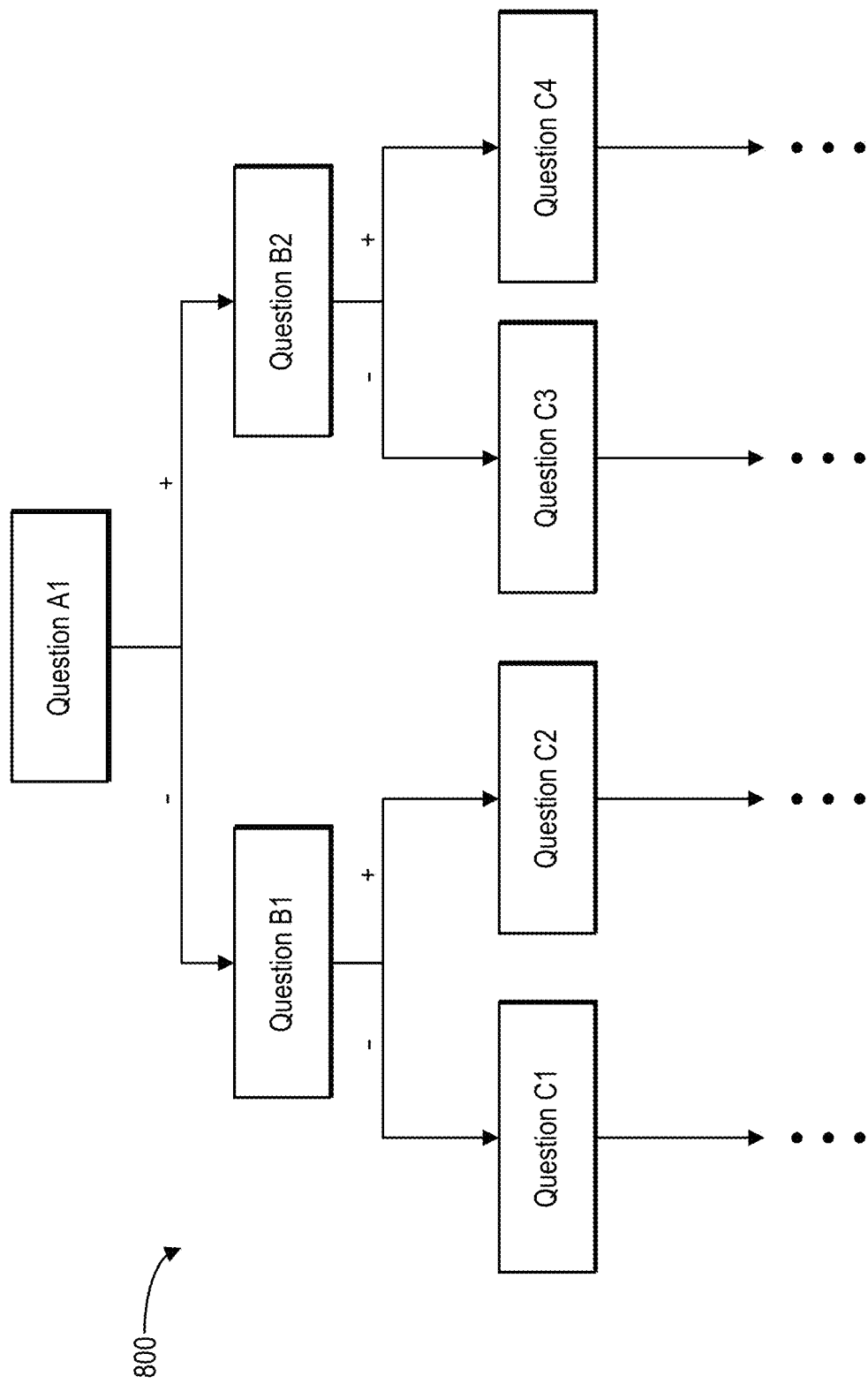
FIG. 8 illustrates an example survey flow in accordance with one or more embodiments.

As mentioned above, the conversational survey system 106 generates a survey flow based on the set of logic rules set by the administrator 116. In particular, FIG. 8 illustrates an example survey flow 800 including a number of survey questions. To illustrate, the survey flow 800 may include Question A1. The survey flow 800 may further include one or more logical conditions that, when triggered, cause the conversational survey system 106 to generate Question B1 or Question B2. In particular, the survey flow 800 may include a logical condition that, in response to detecting a negative sentiment within the response to Question A1, triggers generation of Question B1. The survey flow 800 may also include a logical condition that, upon detecting a positive sentiment, causes generation of Question B2.

Similarly, for Questions B1 and B2, the survey flow 800 can include logical conditions that, based on detecting a negative sentiment or a positive sentiment, cause the conversational survey system 106 to generate one of Question C1, C2, C3, or C4. Although FIG. 8 illustrates specific question boxes within the survey flow 800, in some embodiments the questions are not predetermined. To elaborate, the conversational survey system 106 generates a survey question based on the analysis of a survey response, and therefore each survey question within a survey flow may be different for each different respondent that responds to the survey.

Indeed, the boxes within survey flow 800 of FIG. 8 may instead represent question structures or formats but not the questions themselves. Thus, the conversational survey system 106 can generate a question tailored to a particular survey response while also following a particular question structure for survey questions that follow up positive or negative responses, for example.

Although FIG. 8 illustrates a relatively simple survey flow 800 that includes only two possible logical conditions per question, in some embodiments the conversational survey system 106 can generate a survey flow that is more complicated. In particular, the conversational survey system 106 generate many logical conditions for a single survey question. To elaborate, instead of simple binary decisions (e.g., positive or negative), the conversational survey system 106 can generate logical conditions based on more sophisticated determinations. For instance, the conversational survey system 106 can generate any number of logical conditions based on gradations of sentiment score, magnitude, or other response features, and can further generate logical conditions for each topic identified within a survey response. Thus, in some embodiments, a given question may have many branches that represent a variety of possible follow-up questions within a survey flow.

Figure 9A:
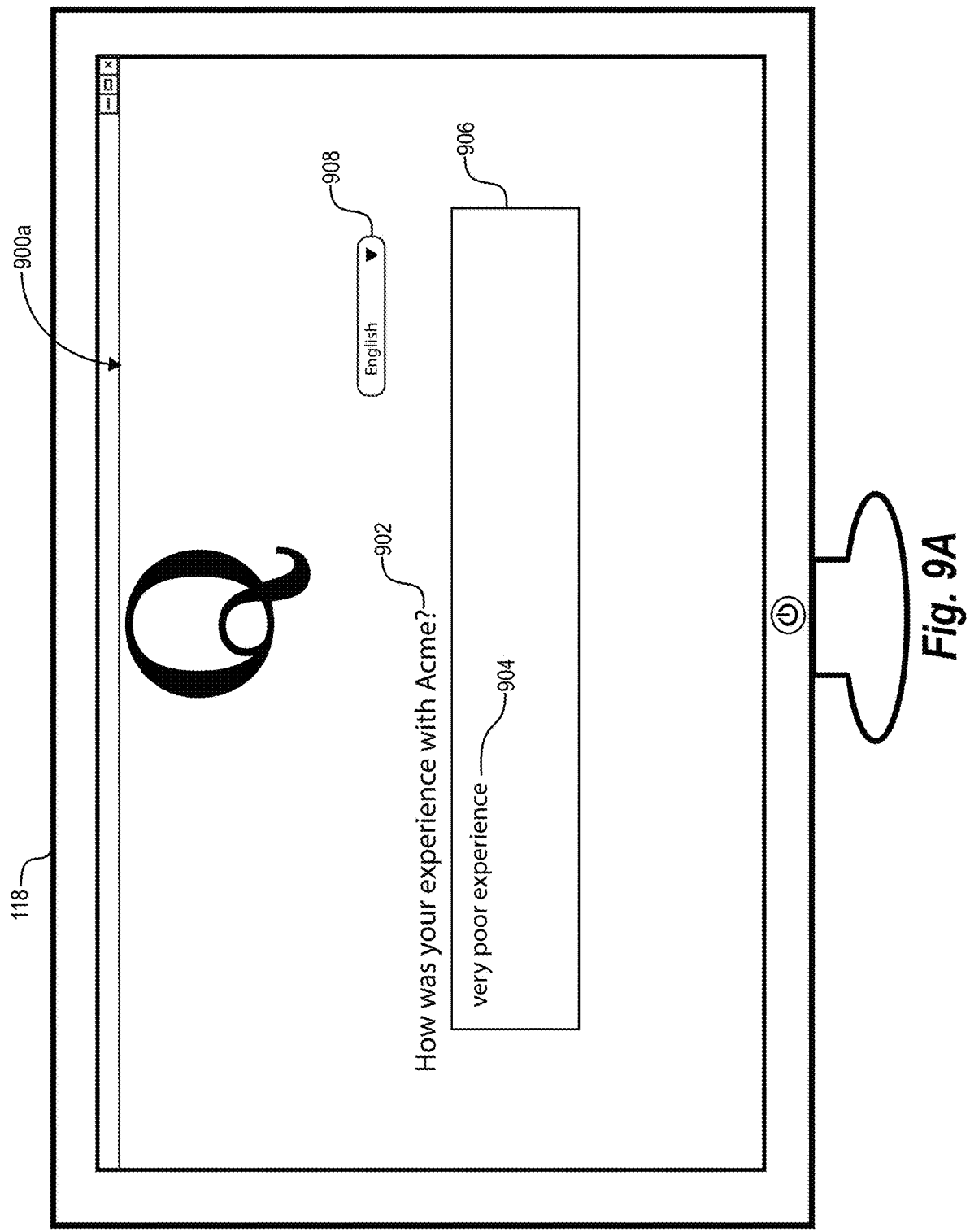
FIGS. 9A-9D illustrate an example respondent client device displaying example interfaces for responding to a survey question and for providing follow-up survey questions based on the responses in accordance with one or more embodiments.

Given the functionality of the conversational survey system 106 and the process of creating a digital survey by way of an administrator client device 112 as described above, it will also be beneficial to understand a respondent perspective of the digital survey. To that end, FIGS. 9A-9D illustrate example GUIs displayed on a respondent client device 118. For example, FIG. 9A illustrates an example respondent client device 118 displaying an interface 900a that includes a survey question 902, a response 904, a text box 906, and a language menu 908.

In particular, the conversational survey system 106 provides the interface 900a to the respondent client device 118, and the respondent 122 responds to the survey question 902 by inputting a response 904 within the text box 906. As described above, the conversational survey system 106 analyzes the response 904 to identify and/or determine topics, response features, or other characteristics. Indeed, in the example shown in FIG. 9A, the conversational survey system 106 determines a sentiment, a magnitude of the sentiment, etc., associated with the topic "experience" based on word choice, length of the response, sentence structure of the response, etc., as described above. Additionally or alternatively, the conversational survey system 106 may further determine an overall sentiment associated with the response as a whole.

Furthermore, the respondent 120 may select a different language from the language menu 908. In response to the respondent 120 selecting a particular language, the conversational survey system 106 analyzes the response via an API for a machine learning service 108 that can analyze text in the given language. In other embodiments, the conversational survey system 106 may analyze the text of the response and determine the language of the response regardless of whether the respondent 120 selects a language from the language menu 908.

While FIG. 9A illustrates a particular arrangement and/or number of elements within the user interface 900a, additional or alternative arrangements are possible. For example, the interface 900a may not include a language menu 908. Likewise, the interfaces 900b-900d of FIGS. 9B-9D may include more or fewer elements or else may have an alternative arrangement of the elements than those depicted in FIGS. 9B-9D.

Figure 9B:
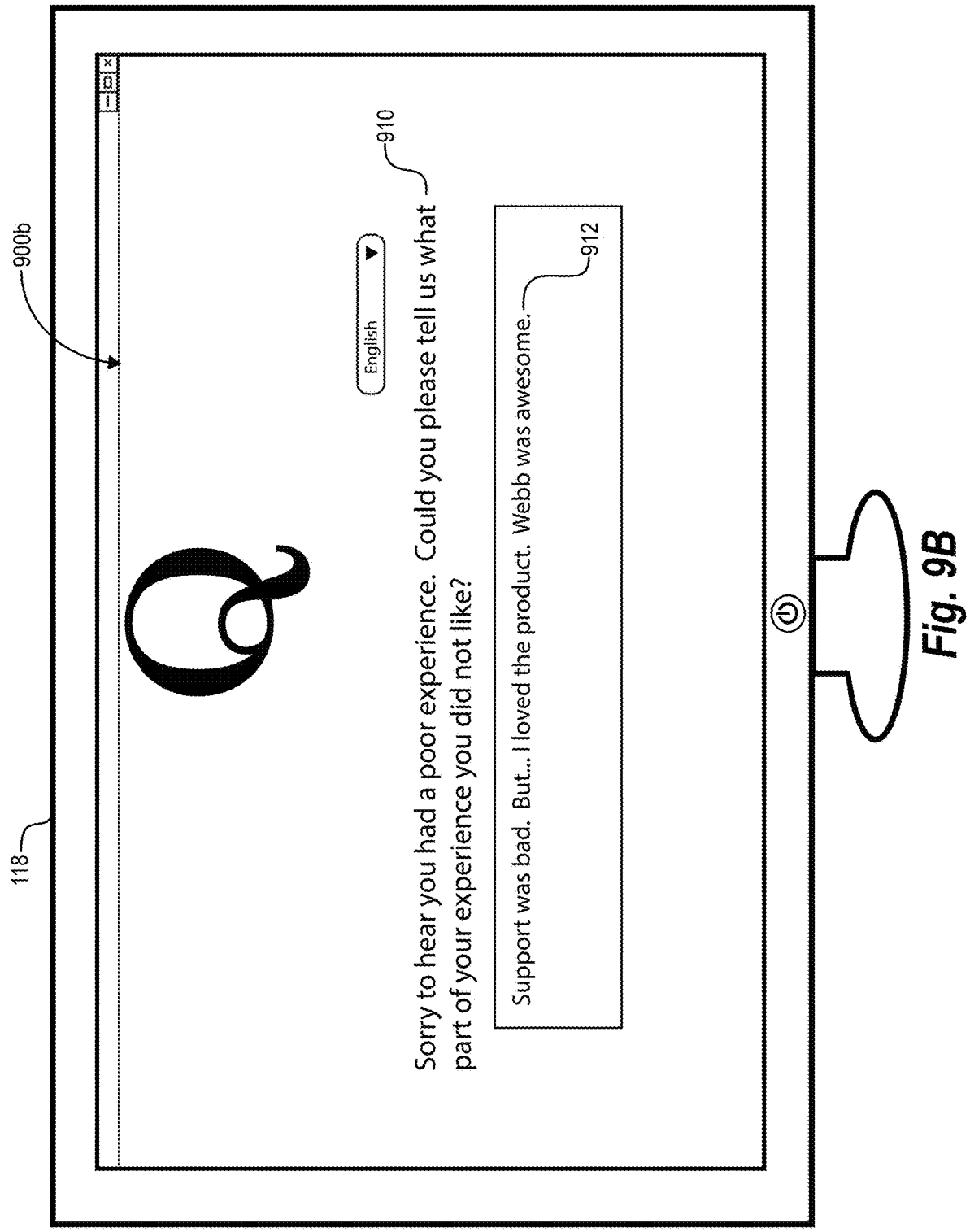

FIG. 9B illustrates the respondent client device 118 displaying a user interface 900b. In particular, the user interface 900b includes a follow-up question 910. For example, based on the analysis of the response 904 of FIG. 9A, and further based on the set of logic rules, the conversational survey system 106 generates and provides the follow-up question 910. The follow-up question 910 is responsive to the response 904 provided by the respondent 122.

To illustrate, the response 904 has a negative sentiment, as expressed by the typed text "very poor experience." Accordingly, the conversational survey system 106 provides a follow-up question 910 that acknowledges the response 904 (e.g., by providing an apology) and that inquires further into the reasons behind the negative sentiment of the response 904. Indeed, as illustrated in FIG. 9B, the conversational survey system 106 provides the follow-up question 910, "Sorry to hear you had a poor experience. Could you please tell us what part of your experience you did not like?"

The respondent 122 may enter a response 912 to the follow-up question, whereupon the conversational survey system 106 analyzes the response 912 in the same manner as described above. In particular, the conversational survey system 106 identifies and/or determines topics and response features associated with the response 912. For example, the conversational survey system 106 identifies topics (e.g., entities) within the response 912 such as, for example, "Support," "product," and "Webb." The conversational survey system 106 further determines a sentiment and/or other response features associated with each entity. For instance, the conversational survey system 106 determines that the sentiment associated with the entity "Support" is negative, while the sentiment associated with the entity "product" is positive, and the sentiment associated with the entity "Webb" is even more positive than the sentiment for "product."

Figure 9C:
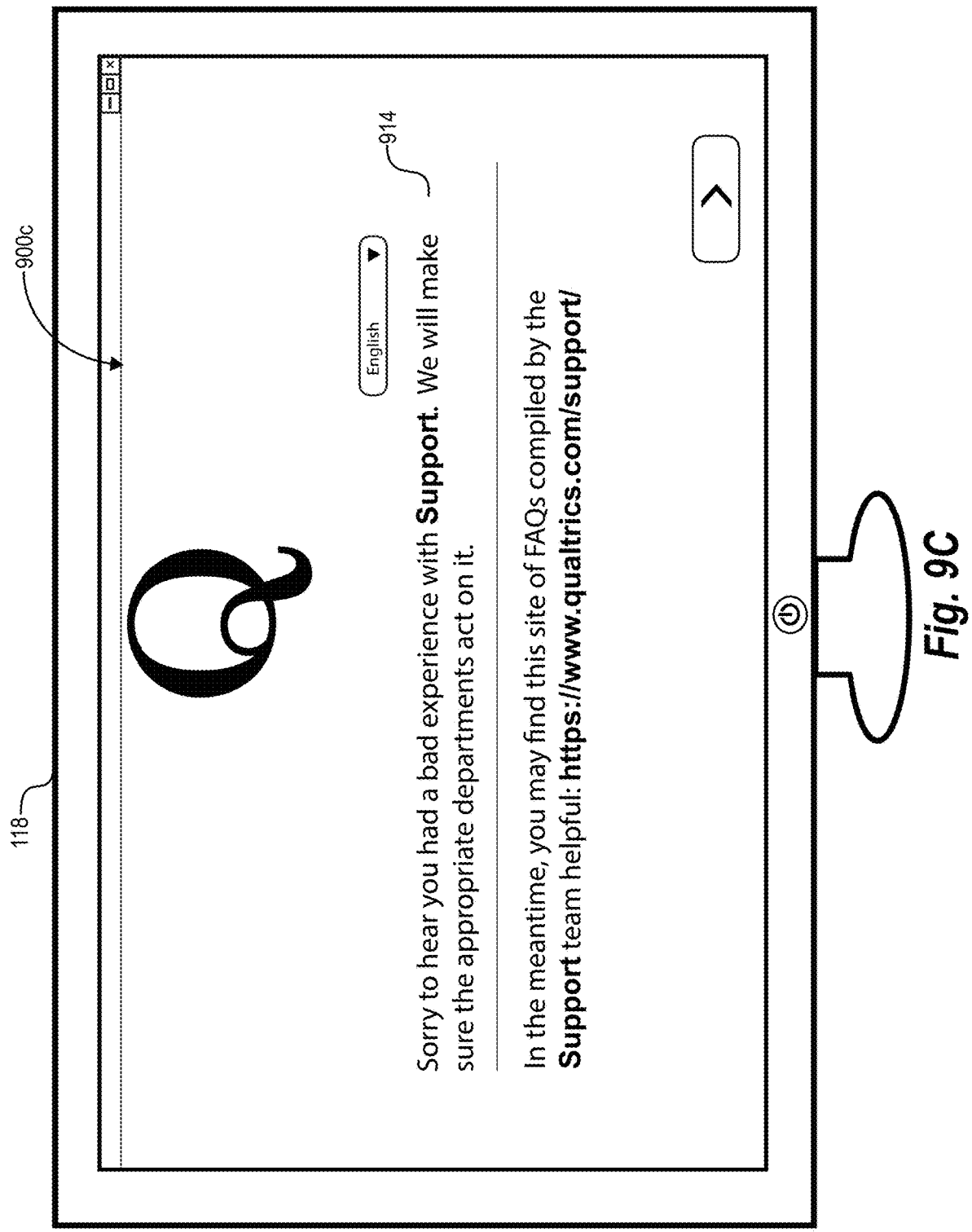

Continuing the discussion of the respondent-end experience, FIG. 9C illustrates the respondent client device 118 displaying a user interface 900c. In particular, the user interface 900c includes a follow-up question 914 that the conversational survey system 106 generates based on the response 912 of FIG. 9B. For example, the conversational survey system 106 analyzes the response 912 as described above and generates a follow-up question 914 to address the entity "support." To illustrate, the conversational survey system 106 generates the follow-up question 914 to apologize to the respondent 122 for the bad experience with support, and further to provide a link by which the respondent 122 can access more information pertaining to the entity "support." As illustrated in FIG. 9C, the follow-up question 914 need not include a question at all. Rather, the follow-up question 914 may only be a statement.

Upon receiving input from the respondent 122 to continue (e.g., by clicking the arrow button), the conversational survey system 106 may determine that the branch of the survey flow that corresponds with logical conditions associated with the entity "support" is complete, and may move on to provide follow-up questions corresponding to the other entities identified within the response 912 until the conversational survey system 106 has completed each branch of the set of logic rules. For example, FIG. 9D illustrates a follow-up question 916 corresponding to the entity "Webb."

Figure 9D:
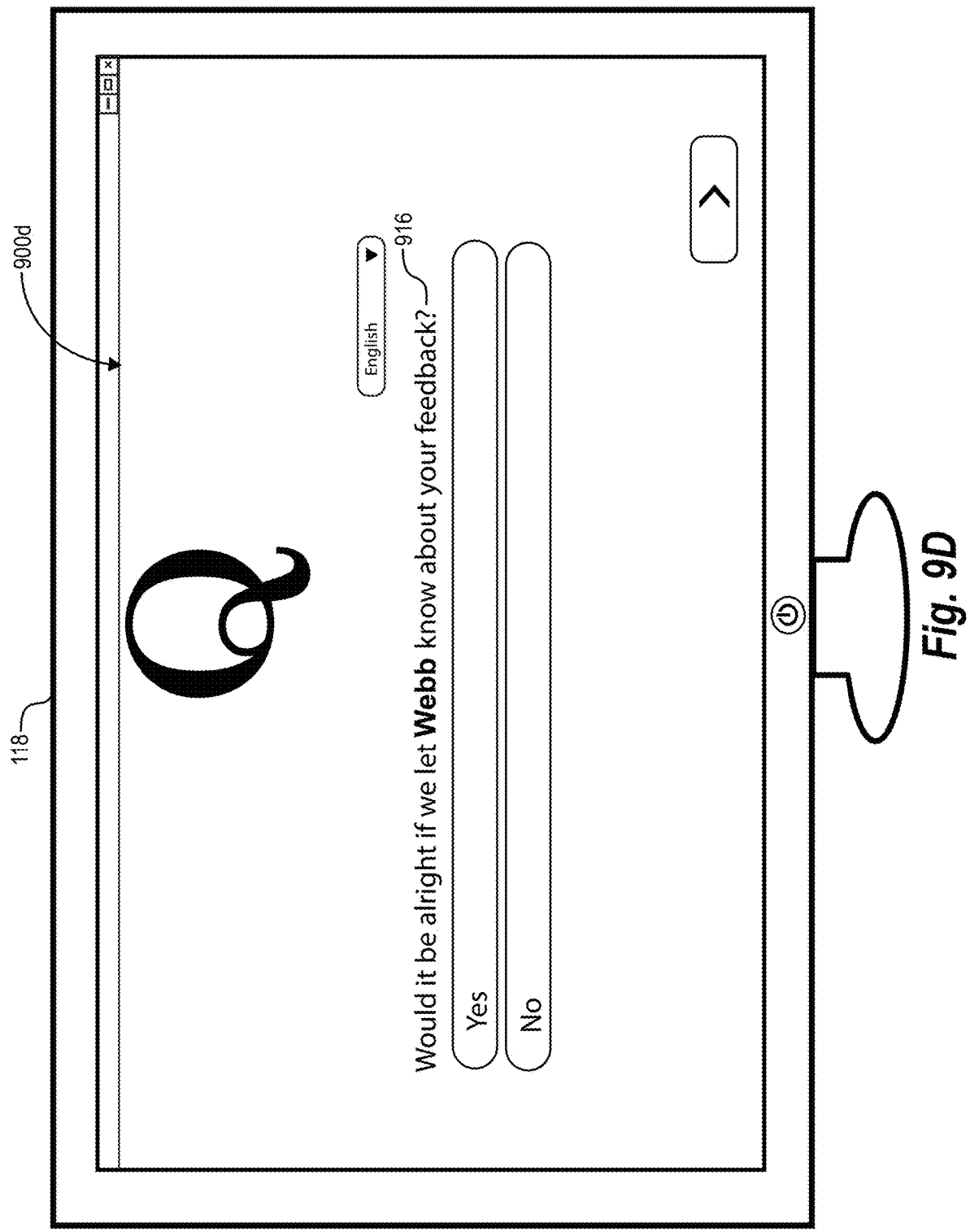

FIG. 9D illustrates the respondent client device 118 including a user interface 900d. In particular, the user interface 900d includes a follow-up question 916 that the conversational survey system 106 generates and provides by the methods and techniques described above. For instance, the conversational survey system 106 generates the follow-up question 916 based on the positive sentiment associated with the entity "Webb" identified within the response 912.

Figure 10:
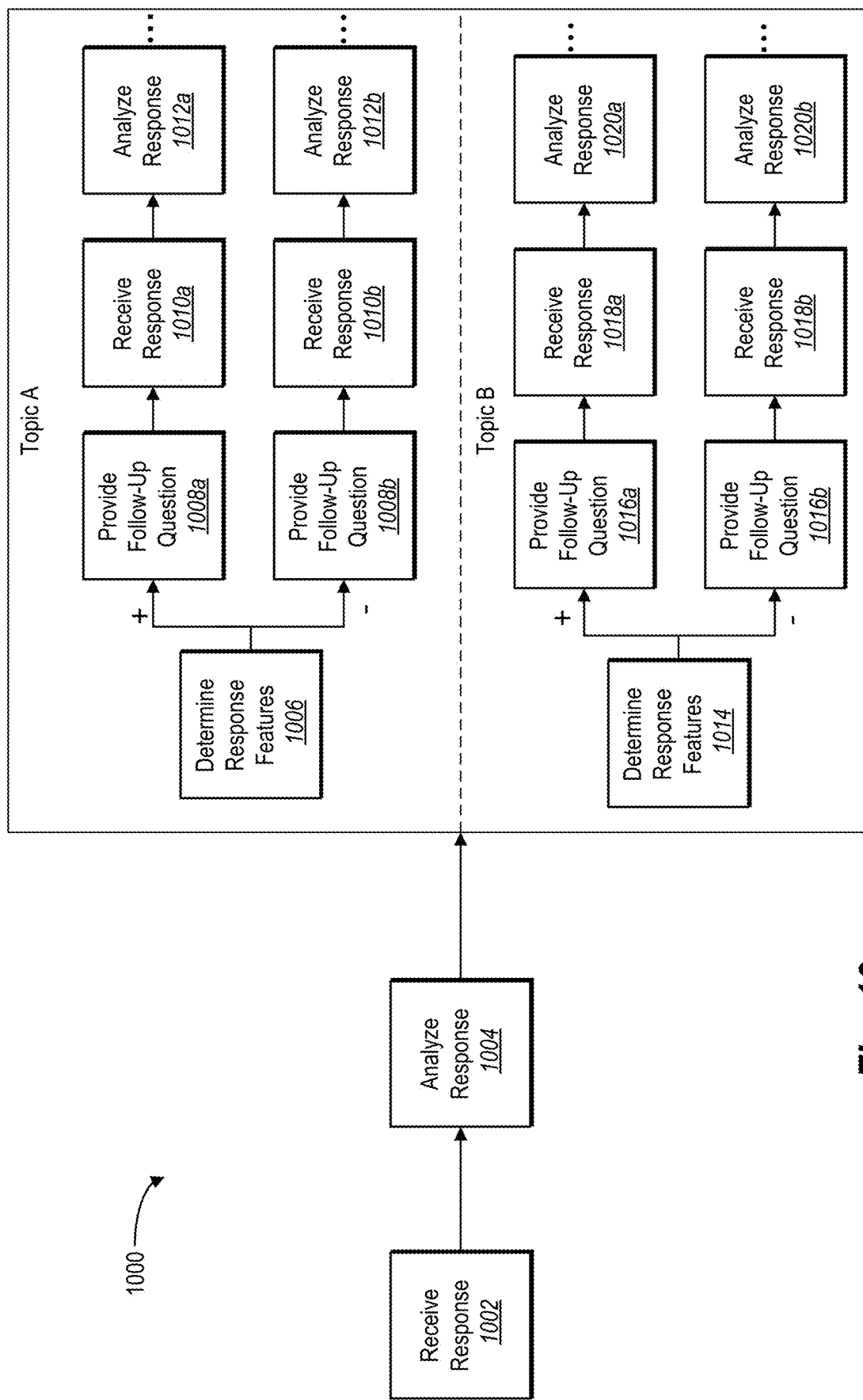
FIG. 10 illustrates a sequence diagram of a logic flow associated with a single survey response in accordance with one or more embodiments.

To elaborate on generating multiple response questions for a single survey response, FIG. 10 illustrates an example flow diagram 1000 of a number of acts associated with the conversational survey system 106. In particular, as illustrated in FIG. 10, the conversational survey system 106 receives a response as discussed above, and as shown by act 1002. Upon receiving the response, the conversational survey system 106 performs act 1004 and to analyze the response in accordance with the disclosure herein. Furthermore, the conversational survey system 106 identifies topics within the response such as topic A and topic B. As shown, the conversational survey system 106 may follow a survey flow based on a set of logic rules the cause the conversational survey system 106 to perform various acts corresponding to topic A, and that further cause the conversational survey system 106 to perform various acts corresponding to topic B identified within the response.

As illustrated in FIG. 10, the conversational survey system 106 may perform each the acts corresponding to topic A to completion, whereupon the conversational survey system 106 may then perform the acts corresponding to topic B. Such acts can include determining response features, providing follow-up questions, receiving a response, determining response features, and identifying topics, as described above.

More specifically, depending on the logic rules associated with topic A, the conversational survey system 106 performs act 1006 to determine response features associated with topic A. Depending on the response feature such as, for example, a sentiment score, the conversational survey system 106 performs one of act 1008*a* or 1008*b*. For example, if conversational survey system 106 determines that the sentiment corresponding to topic A is positive, then the conversational survey system 106 performs act 1008*a* to provide a first follow-up question. If, on the other hand, the conversational survey system 106 determines that the sentiment corresponding to entity A is negative, the conversational survey system 106 performs act 1008*b* to provide a second follow-up question.

As further illustrated in FIG. 10, the conversational survey system 106 performs acts successively in response to determining that the sentiment associated with topic A is positive. In particular, the conversational survey system 106 performs act 1010*a* to receive a subsequent response and further performs act 1012*a* to analyze the subsequent response. Acts 1010*a* and 1012*a* are performed according to the methods and techniques described above.

The conversational survey system 106 alternatively performs a different sequence of acts in response to determining that the sentiment associated with topic A is negative. For example, as described above, the conversational survey system 106 provides a follow-up question according to act 1008*b*, and further performs act 1010*b* and act 1012*b* to receive a subsequent response and analyze the subsequent response, respectively.

As illustrated in FIG. 10, the conversational survey system 106 performs acts corresponding to topic B as well. For example, in some embodiments, the conversational survey system 106 performs the acts corresponding to topic B upon first completing the acts corresponding to topic A. In other embodiments, as mentioned above, the conversational survey system 106 alternates performing acts corresponding to topic A and topic B. In either case, the conversational survey system 106 performs the acts of FIG. 10 in accordance with the logic rules set by the administrator 116.

Specifically, the conversational survey system 106 performs act 1014 to determine response features. Based on those response features, and further based on the logic rules associated with topic B, the conversational survey system 106 performs the subsequent acts shown in FIG. 10. For example, the conversational survey system 106 performs act 1016*a* to provide a follow-up question in response to determining that the sentiment associated with topic B satisfies a particular logic rule (e.g., the sentiment is positive, the sentiment is above a particular threshold, etc.). On the other hand, in response to determining that the sentiment (or other response feature) does not satisfy the particular logic rule (or determining that the sentiment satisfies a different logic rule), the conversational survey system 106 performs act 1016*b* to provide a different follow-up question.

As discussed above with reference to topic A, the conversational survey system 106 further performs (e.g., based on determining that the sentiment associated with topic B satisfies the particular logic rule) act 1018*a* to receive a response. The conversational survey system 106 further performs act 1020*a* to analyze the response. Furthermore, the conversational survey system 106 performs act 1018*b* and act 1020*b* based on determining that the sentiment (or other response feature) associated with topic B does not satisfy the particular logic rule (or that the sentiment associated topic B satisfies a different logic rule/logical condition).

While FIG. 10 illustrates two topics, topic A and topic B, in some embodiments, the conversational survey system 106 identifies more or fewer topics. Based on the number of topics that the conversational survey system 106 identifies, the conversational survey system 106 performs a number of acts associated with each topic to generate and provide follow-up questions. In the same or other embodiments, the conversational survey system 106 need not complete a particular branch of the set of logic rules—i.e., finish each act corresponding to a particular topic—but may instead alternate performing acts corresponding to each different entity in turn, according to the set of logic rules.

Likewise, each response feature can branch into more than two possible follow-up questions. For instance, as described above, the conversational survey system 106 can determine various gradations of sentiment scores, where a sentiment score within a particular range can cause the conversational survey system 106 to generate a first follow-up question, while a sentiment score within a different range can cause the conversational survey system 106 to generate a second follow-up question.

In some embodiments, the conversational survey system 106 can identify a pre-defined number of topics or entities for which to provide follow-up questions. In addition, or alternatively, the conversational survey system 106 may provide follow-up questions for only those topic that meet a predefined (e.g., as defined by a logic rule) threshold level of significance, such as a sentiment score threshold, magnitude score, or other score or response feature.

Moreover, the conversational survey system 106 may provide follow-up questions only upon detecting a pre-defined topic, while not providing follow-up questions for other topics identified in a response. In some embodiments, the conversational survey system 106 identifies a defined number of topics.

Figure 11:
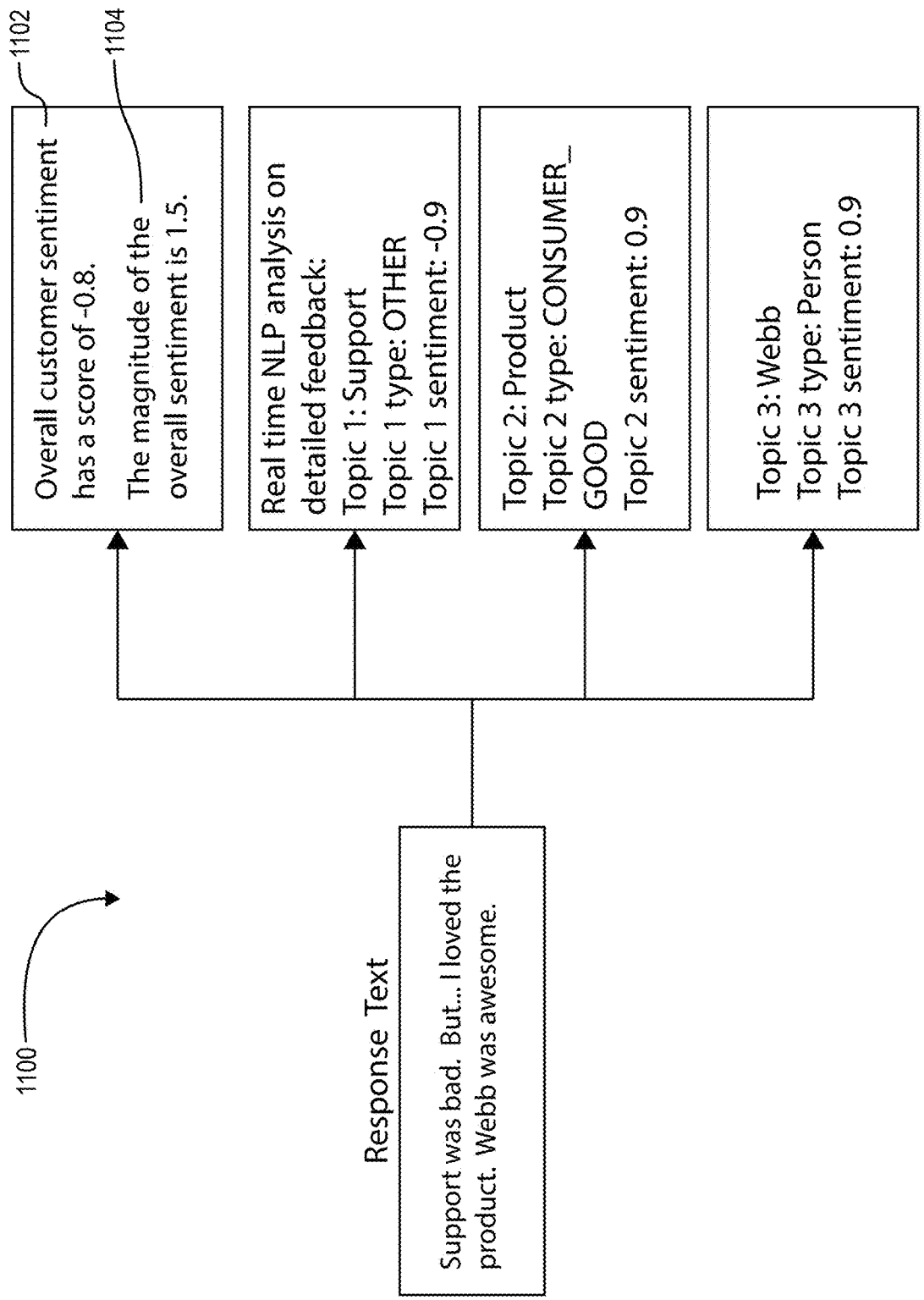
FIG. 11 illustrates example response features of a survey response in accordance with one or more embodiments.

To elaborate on receiving and analyzing a survey response, it will be beneficial to provide a discussion relating to the survey questions and corresponding response described above in relation to FIGS. 9A-9D. In particular, FIG. 11 illustrates an example response schematic 1100. For example, the schematic 1100 includes response feature scores for the sequence of survey questions and responses depicted in FIGS. 9A-9D. FIG. 11 includes an overall sentiment 1102 and an overall magnitude of the sentiment 1104. For example, looking to FIG. 9A, the conversational survey system 106 analyzes the response 904 to determine that the overall sentiment of the response 904 is −0.8. Additionally, based on the overall length (e.g., number of characters) of the response 904, the conversational survey system 106 determines that the effort taken by the respondent 122 correlates with a magnitude of 1.5. In some embodiments, the conversational survey system 106 may display the results of determining the response features associated with the response 904 to the administrator 116 by way of administrator client device 112, in other embodiments, the conversational survey system 106 simply processes the response features without providing a visual indication of the response features.

As further shown in FIG. 11, the conversational survey system 106 analyzes the response 912 from FIG. 9B to identify the topics and response features described above. In particular, the conversational survey system 106 determines that, based on the language of the response 912, the type of the entity "support" is "other" and that the sentiment associated with the entity "support" is negative at −0.9.

FIG. 11 further illustrates that the conversational survey system 106 identifies entity "product" and determines that the type of entity "product" is "consumer good." The conversational survey system 106 further determines that the sentiment associated with the entity "product" is positive at 0.9. Likewise, the conversational survey system 106 determines that entity "Webb" is type "Person" and that entity "Webb" has a positive sentiment of 0.9. Thus, FIG. 11 illustrates a visual representation of the information the conversational survey system 106 receives, generates, analyzes, and uses to determine to provide a follow-up question, generate a follow-up question, and/or customize a follow-up question based on information within a response.

Figure 12:
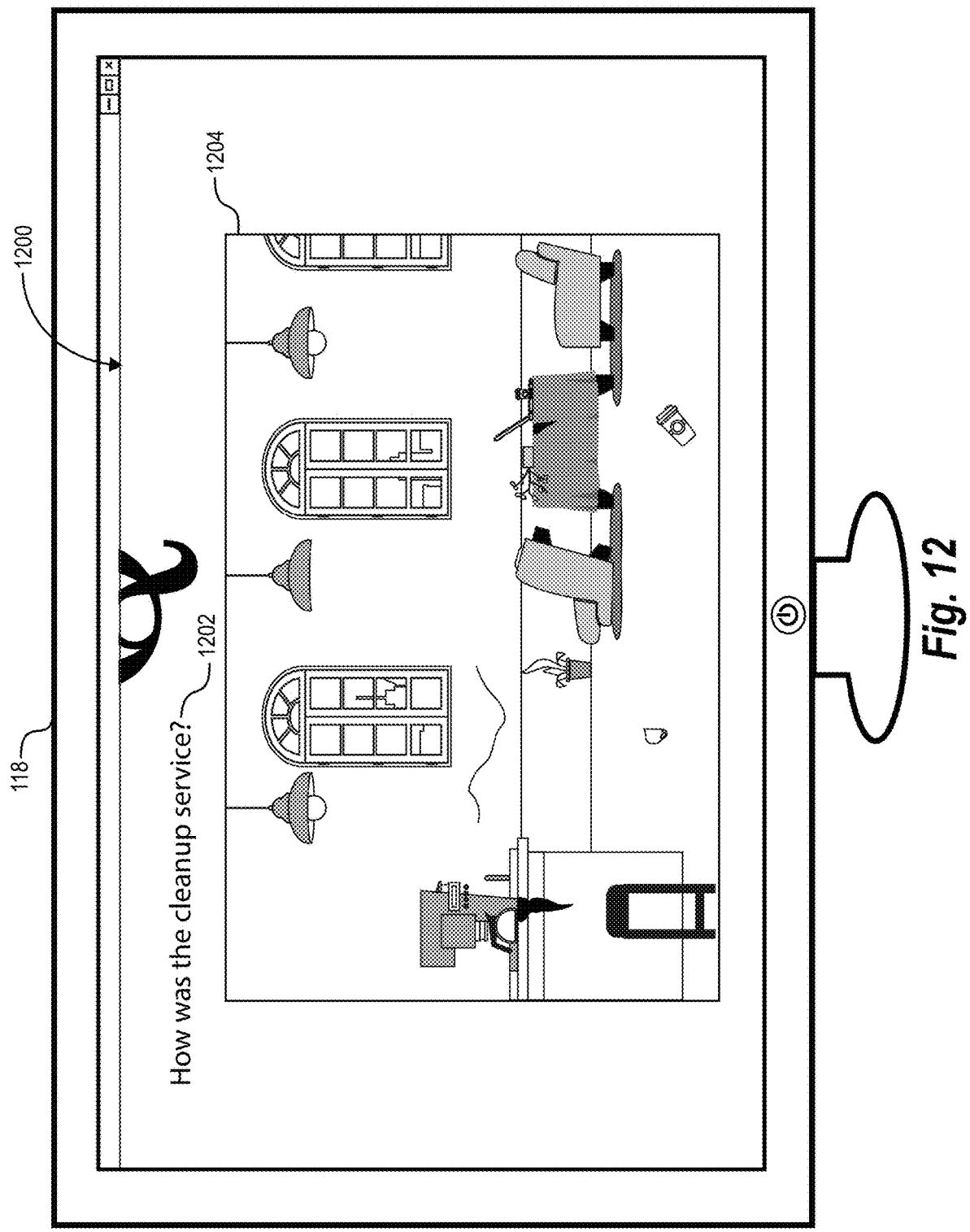
FIG. 12 illustrates an interface for responding to a survey question with an image in accordance with one or more embodiments.

As mentioned above, the conversational survey system 106 can further analyze survey responses that include input other than text. For example, FIG. 12 illustrates an example respondent client device 118 including an interface 1200. In particular, the interface 1200 includes a survey question 1202 presented for display to the respondent 122. The interface 1200 further includes an image 1204 that the respondent 122 uploads, attaches, submits, or otherwise uses as a response to the survey question 1202. Upon determining that the response to the survey question 1202 is an image 1204, the conversational survey system 106 performs image-based machine learning to analyze the image 1204. Based on analyzing the image 1204, the conversational survey system 106 identifies one or more entities therein and further determines one or more other response features associated with the response overall and/or associated with the one or more entities.

For example, as illustrated in FIG. 12, the survey question 1202 asks, "How was the cleanup service?" The respondent 122 uploads the image 1204 that includes a picture of a café with spilled coffee on the counter, an overturned chair, trash on the floor, a mark on the wall, a missing lightbulb, etc. Based on analyzing the image 1204 (in accordance with a survey defined by logic rules) and/or the survey question 1202, the conversational survey system 106 may identify an entity "cleanup service." The conversational survey system 106 may further determine that a sentiment associated with the cleanup service entity is negative (e.g., −0.8) because of the trash and other messes depicted within the image 1204. Furthermore, the conversational survey system 106 may determine that the magnitude of the sentiment is relatively large (e.g., 80 on a scale from 1 to 100) because of the effort that the respondent 122 went through to take a picture and upload it as a response to the survey question 1202.

As another type of survey response input, the conversational survey system 106 can also analyzes survey responses that include voice input from a respondent 122. FIG. 13 illustrates an example respondent client device 118 configured to communicate with the respondent 122 via audio survey questions. For example, as shown in FIG. 13 the conversational survey system 106 provides an audio survey question 1302 to the respondent 122 via the respondent client device 118. The audio survey question 1302 in FIG. 13 asks "How was your customer experience?"

In response to the audio survey question 1302, the respondent 122 responds with a verbal response 1304, "The service was terrible! But I really liked the product." From this response, the conversational survey system 106 performs an audio-based machine learning technique to identify the topics "service" and "product," in addition to response features associated with each of the identified entities. Alternatively, the conversational survey system 106 performs a speech-to-text method to convert the verbal response 1304 into text, whereupon the conversational survey system 106 further analyzes the text as described above.

In addition to identifying the topics within the verbal response 1304, the conversational survey system 106 determines a sentiment, a type of topic, or other response feature, associated with the topic "service" and the topic "product." For example, the conversational survey system 106 may determine that the sentiment associated with the topic "service" is −0.9, while the sentiment associated with the topic "product" is 0.8.

Figure 14:
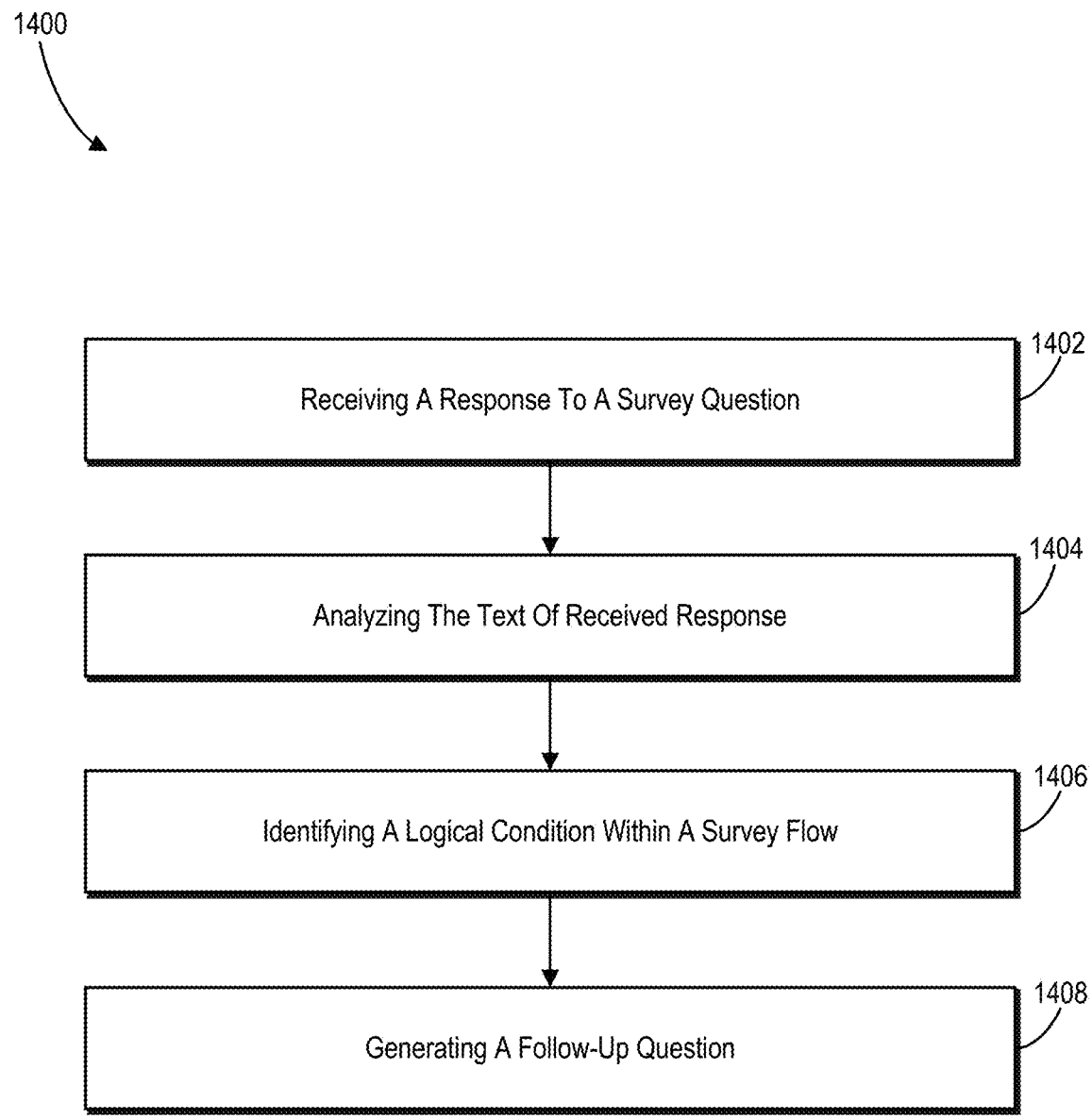
FIG. 14 illustrates a series of acts in a method for generating a follow-up survey question in accordance with one or more embodiments.

FIGS. 1-13, the corresponding text, and the examples provide a number of different systems and methods for generating a conversational digital survey. In addition to the foregoing, embodiments can also be described in terms of flowcharts comprising acts steps in a method for accomplishing a particular result. For example, turning now to FIG. 14, this figure illustrates a flowchart of a series of acts 1400 of determining an impact of digital content based on a survey administration packet. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer readable medium can comprise instructions, that when executed by one or more processors, cause a computing device to perform the acts of FIG. 14. In still further embodiments, a system can perform the acts of FIG. 14.

The series of acts 1400 includes an act 1402 of receiving a response to a survey question. In particular, the act 1402 can involve receiving, from a respondent client device, a response to a survey question associated with a digital survey, the response comprising a string of text.

As shown, the series of acts 1400 further includes an act 1404 of analyzing the text of the received response. In particular, the act 1404 can involve analyzing the text of the received response to determine a response feature associated with the received response. The act 1404 can further involve implementing a machine learning model to analyze the text of the received response. The series of acts can also include an act of training the machine learning model by accessing, from a digital survey database, a training response to provide to the machine learning model, generating, by way of the machine learning model, a predicted response feature for the training response, comparing the predicted response feature with an actual response feature associated with the training response to determine an error between the predicted response feature and the actual response feature, and reducing the error between the predicted response feature and the actual response feature.

The act 1404 can further involve receiving a set of response features from an administrator client device, and analyzing, based on the set of response features, the text of the received response to identify characteristics of the received response that correspond to one or more of the set of response features.

As further illustrated in FIG. 14, the series of acts 1400 includes an act 1406 of identifying a logical condition within a survey flow. In particular, the act 1406 can involve identifying a logical condition within a survey flow that corresponds to the determined response feature.

As also shown, the series of acts 1400 includes an act 1408 of generating a follow-up question. In particular, the act 1408 can involve generating, based on the identified condition within the survey flow, a follow-up question to provide to the respondent client device. The act 1408 can also involve determining, within the survey flow, a logical condition that corresponds to the identified topic and to the determined sentiment associated with the identified topic, and generating a follow-up question that corresponds to the determined logical condition. In addition, the follow-up question can include a survey question that prompts a freeform text response.

Although not illustrated in FIG. 14, the series of acts 1400 can further include acts of receiving, from an administrator client device, a set of logic rules to apply to one or more responses received for the digital survey provided to the respondent client device, and generating, based on the set of logic rules, the survey flow for the digital survey, the survey flow including, for one or more of the set of logic rules, a corresponding logical condition that, when triggered, causes generation of a new survey question as part of the digital survey.

The series of acts 1400 can also include an act of identifying, based on analyzing the text associated with the received response, a topic associated with the received response, and an act of determining, based on analyzing the text associated with the received response, a response feature associated with the identified topic, wherein the response feature includes a sentiment that reflects an attitude of a respondent associated with the respondent client device toward the identified topic. Additionally, the series of acts 1400 can include an act of determining a second response feature associated with the received response, wherein the second response feature includes a magnitude associated with the received response that reflects an effort taken by a respondent associated with the respondent client device to provide the response.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
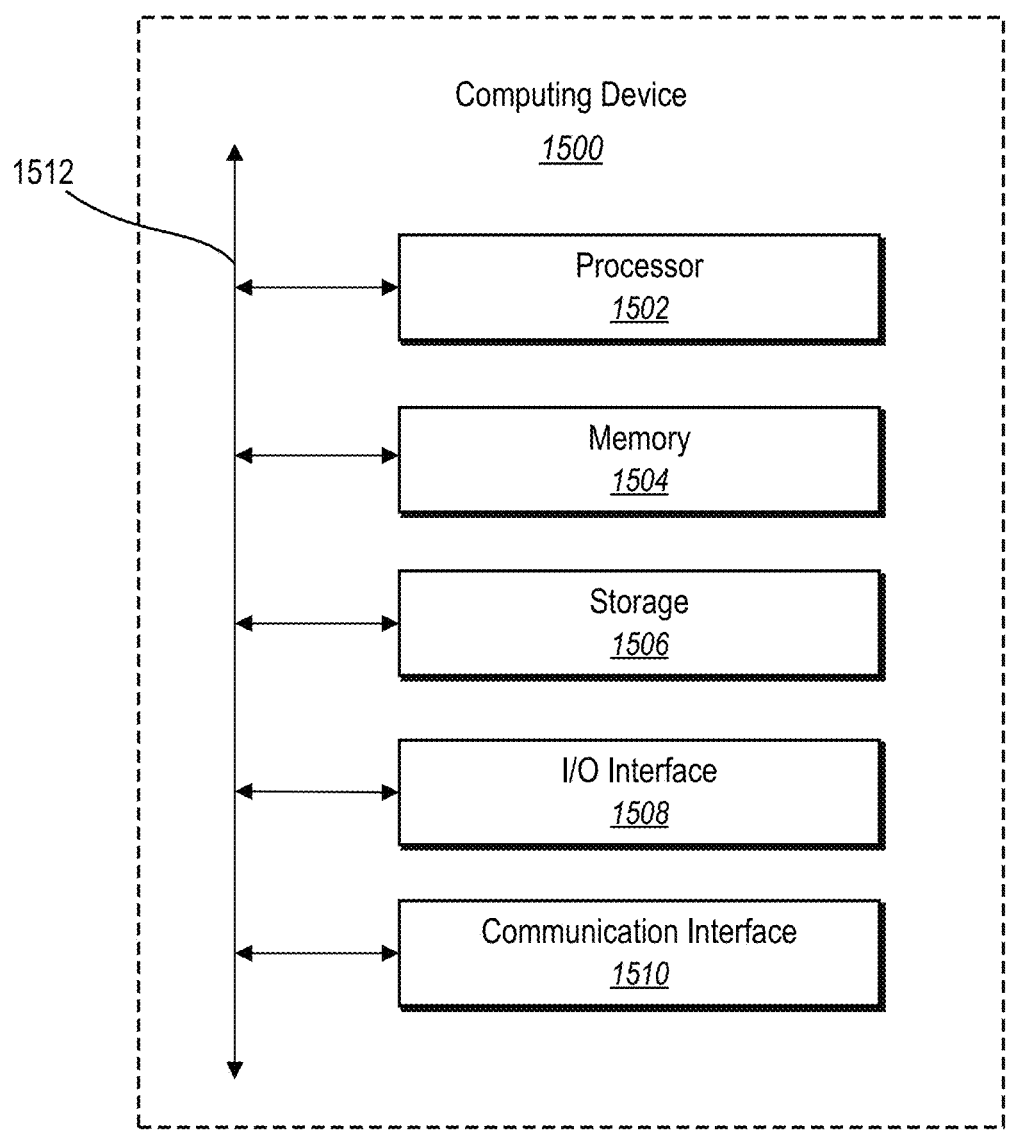
FIG. 15 illustrates a block diagram of an exemplary computing device in accordance with one or more embodiments.

FIG. 15 illustrates, in block diagram form, an exemplary computing device 1500 that can be configured to perform one or more of the processes described above. One will appreciate that the conversational survey system 106 can comprise implementations of the computing device 1500. As shown by FIG. 15, the computing device can comprise a processor 1502, memory 1504, a storage device 1506, an I/O interface 1508, and a communication interface 1510. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 can retrieve (or fetch) the instructions from an internal register, an internal cache, memory 1504, or a storage device 1506 and decode and execute them.

The computing device 1500 includes memory 1504, which is coupled to the processor(s) 1502. The memory 1504 can be used for storing data, metadata, and programs for execution by the processor(s). The memory 1504 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1504 can be internal or distributed memory.

The computing device 1500 includes a storage device 1506 includes storage for storing data or instructions. As an example, and not by way of limitation, storage device 1506 can comprise a non-transitory storage medium described above. The storage device 1506 can include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 can include a mouse, keypad or a keyboard, a touch screen, camera, optical scanner, network interface, modem, other known I/O devices or a combination of such I/O devices/interfaces 1508. The touch screen can be activated with a stylus or a finger.

The I/O devices/interfaces 1508 can include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data can be representative of one or more graphical user interfaces and/or any other graphical content as can serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 can include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

Figure 16:
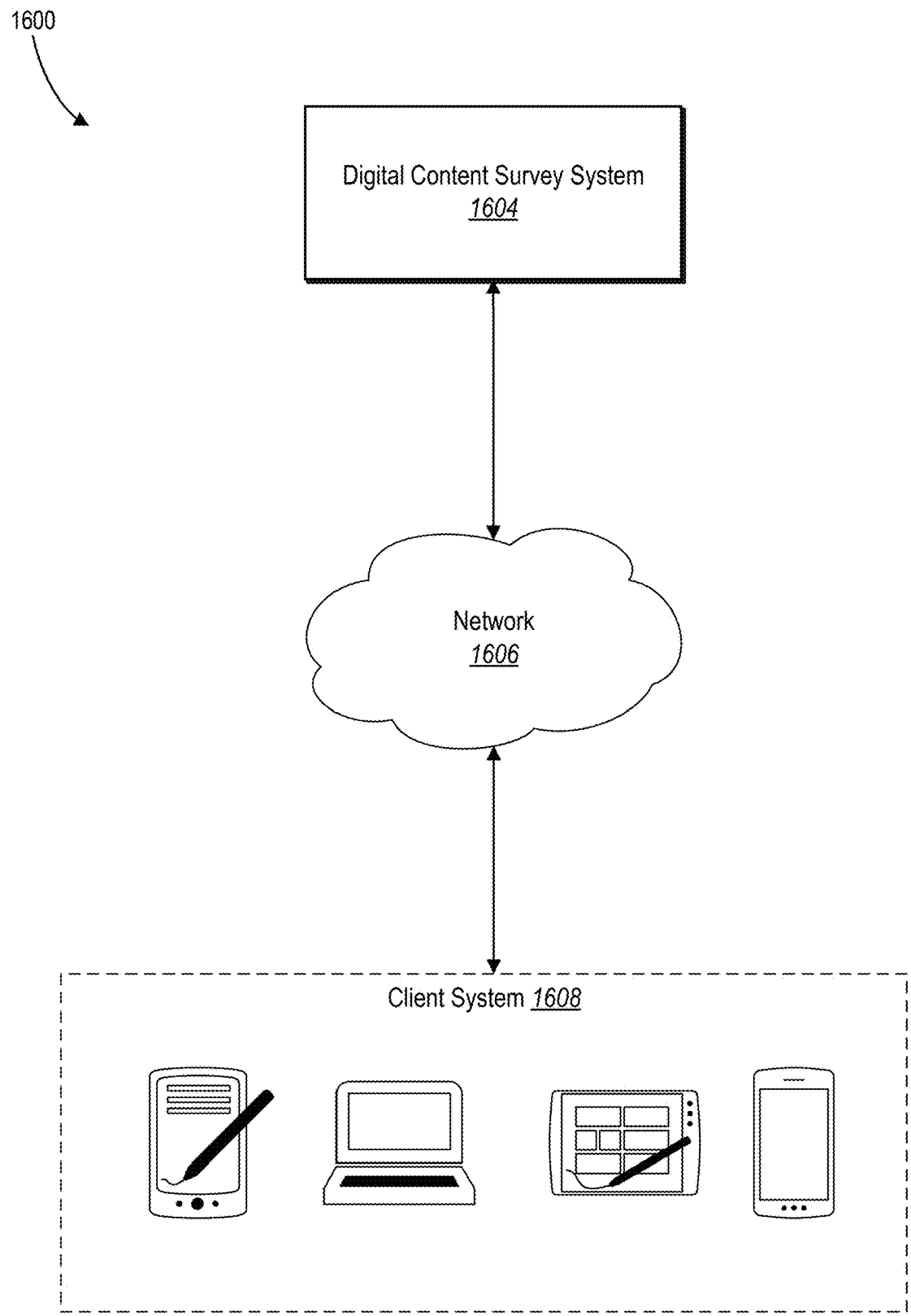
FIG. 16 illustrates an example conversational survey system in accordance with one or more embodiments.

FIG. 16 illustrates an example network environment 1000 of a digital content survey system. Network environment 1000 includes a client system 1608 and a digital content survey system 1604 connected to each other by a network 1606. Although FIG. 16 illustrates a particular arrangement of client system 1608, digital content survey system 1604, and network 1606, this disclosure contemplates any suitable arrangement of client system 1608, digital content survey system 1604, and network 1606. As an example, and not by way of limitation, two or more of client system 1608, digital content survey system 1604, bypassing network 1606. As another example, two or more of client system 1608, and digital content survey system 1604 can be physically or logically co-located with each other in whole or in part. Moreover, although FIG. 16 illustrates a particular number of client systems 1608, digital content survey system 1604, and networks 1606, this disclosure contemplates any suitable number of client systems 1608, digital content survey system 1604, and networks 1606. As an example, and not by way of limitation, network environment 1000 can include multiple client system 1608, digital content survey system 1604, and networks 1606.

This disclosure contemplates any suitable network 1606. As an example, and not by way of limitation, one or more portions of network 1606 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1606 can include one or more networks 1606.

Links can connect client system 1608, and digital content survey system 1604 to communication network 1606 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links can differ in one or more respects from one or more second links.

In particular embodiments, client system 1608 can be an electronic device including hardware, software, or embedded logic components or a combination of two or more such components and capable of carrying out the appropriate functionalities implemented or supported by client system 1608. As an example, and not by way of limitation, a client system 1608 can include any of the computing devices discussed above in relation to FIG. 16. A client system 1608 can enable a network user at client system 1608 to access network 1606. A client system 1608 can enable its user to communicate with other users at other client systems 1608.

In particular embodiments, client system 1608 can include a web browser, such as MICROSOFT INTERNET EXPLORER, GOOGLE CHROME or MOZILLA FIREFOX, and can have one or more add-ons, plug-ins, or other extensions, such as TOOLBAR or YAHOO TOOLBAR. A user at client system 1608 can enter a Uniform Resource Locator (URL) or other address directing the web browser to a particular server (such as server), and the web browser can generate a Hyper Text Transfer Protocol (HTTP) request and communicate the HTTP request to server. The server can accept the HTTP request and communicate to client system 1608 one or more Hyper Text Markup Language (HTML) files responsive to the HTTP request. Client system 1608 can render a webpage based on the HTML files from the server for presentation to the user. This disclosure contemplates any suitable webpage files. As an example, and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, digital content survey system 1604 can be a network-addressable computing system that can host an online chat network. Digital content survey system 1604 can generate, store, receive, and send chat question, chat response data, such as, for example, user-profile data, concept-profile data, text data, or other suitable data related to the online chat network. Digital content survey system 1604 can be accessed by the other components of network environment 1000 either directly or via network 1606. In particular embodiments, digital content survey system 1604 can include one or more servers. Each server can be a unitary server or a distributed server spanning multiple computers or multiple datacenters. Servers can be of various types, such as, for example and without limitation, web server, news server, mail server, message server, advertising server, file server, application server, exchange server, database server, proxy server, another server suitable for performing functions or processes described herein, or any combination thereof. In particular embodiments, each server can include hardware, software, or embedded logic components or a combination of two or more such components for carrying out the appropriate functionalities implemented or supported by server. In particular embodiments, digital content survey system 1604 can include one or more data stores. Data stores can be used to store various types of information. In particular embodiments, the information stored in data stores can be organized according to specific data structures. In particular embodiments, each data store can be a relational, columnar, correlation, or other suitable database. Although this disclosure describes or illustrates particular types of databases, this disclosure contemplates any suitable types of databases. Particular embodiments can provide interfaces that enable a client system 1608, or a digital content survey system 1604 to manage, retrieve, modify, add, or delete, the information stored in data store.

In particular embodiments, digital content survey system 1604 can provide users with the ability to take actions on various types of items or objects, supported by digital content survey system 1604. As an example, and not by way of limitation, the items and objects can include groups or chat networks to which users of digital content survey system 1604 can belong, events or calendar entries in which a user might be interested, computer-based applications that a user can use, transactions that allow users to buy or sell items via the service, interactions with advertisements that a user can perform, or other suitable items or objects. A user can interact with anything that is capable of being represented in digital content survey system 1604 or by an external system of a third-party system, which is separate from digital content survey system 1604 and coupled to digital content survey system 1604 via a network 1606.

In particular embodiments, digital content survey system 1604 can be capable of linking a variety of entities. As an example, and not by way of limitation, digital content survey system 1604 can enable users to interact with each other or other entities, or to allow users to interact with these entities through an application programming interfaces (API) or other communication channels.

In particular embodiments, digital content survey system 1604 also includes user-generated content objects, which can enhance a user's interactions with digital content survey system 1604. User-generated content can include anything a user can add, upload, send, or "post" to digital content survey system 1604. As an example, and not by way of limitation, a user communicates chats to digital content survey system 1604 from a client system 1608. Chats can include data such as chat questions or other textual data, location information, photos, videos, links, music or other similar data or media. Content can also be added to digital content survey system 1604 by a third-party through a "communication channel," such as a newsfeed or stream.

In particular embodiments, digital content survey system 1604 can include a variety of servers, sub-systems, programs, modules, logs, and data stores. In particular embodiments, digital content survey system 1604 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Digital content survey system 1604 can also include suitable components such as network interfaces, security mechanisms, load balancers, failover servers, management-and-network-operations consoles, other suitable components, or any suitable combination thereof. In particular embodiments, digital content survey system 1604 can include one or more user-profile stores for storing user profiles. A user profile can include, for example, biographic information, demographic information, behavioral information, social information, or other types of descriptive information, such as work experience, educational history, hobbies or preferences, interests, affinities, or location.

The web server can include a mail server or other messaging functionality for receiving and routing messages between digital content survey system 1604 and one or more client systems 1608. An action logger can be used to receive communications from a web server about a user's actions on or off digital content survey system 1604. In conjunction with the action log, a third-party-content-object log can be maintained of user exposures to third-party-content objects. A notification controller can provide information regarding content objects to a client system 1608. Information can be pushed to a client system 1608 as notifications, or information can be pulled from client system 1608 responsive to a request received from client system 1608. Authorization servers can be used to enforce one or more privacy settings of the users of digital content survey system 1604. A privacy setting of a user determines how particular information associated with a user can be shared. The authorization server can allow users to opt in to or opt out of having their actions logged by digital content survey system 1604 or shared with other systems, such as, for example, by setting appropriate privacy settings. Third-party-content-object stores can be used to store content objects received from third parties. Location stores can be used for storing location information received from client systems 1608 associated with users.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention can be embodied in other specific forms without departing from its spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein can be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
providing, to an administrator client device, a survey creation interface comprising a plurality of manipulable survey creation blocks arranged in a nested visual survey flow mapping logical conditions defining branches of respective processes for administering a digital survey;
in response to a first client device interaction to adjust the plurality of manipulable survey creation blocks within the survey creation interface, modifying the nested visual survey flow to include a machine learning block that maps a sentiment prediction machine learning model to a branch of the logical conditions for administering the digital survey;
providing a digital survey question of the digital survey to a respondent client device;
receiving, from the respondent client device, a text-based response to the digital survey question of the digital survey;
analyzing, based on detecting that the branch for the machine learning block within the nested visual survey flow is triggered according to the logical conditions, the text-based response utilizing the sentiment prediction machine learning model of the machine learning block to identify an indicated topic and to determine a sentiment score associated with the indicated topic;
determining that the sentiment score for the indicated topic satisfies a logical condition from among the logical conditions mapped by the nested visual survey flow;
selecting, based on determining that the sentiment score for the indicated topic satisfies the logical condition, a follow-up digital survey question according to the nested visual survey flow arranged via the survey creation interface; and
providing the follow-up digital survey question to the respondent client device.

2. The method of claim 1, wherein selecting the follow-up digital survey question comprises triggering the follow-up digital survey question according to the nested visual survey flow in response to satisfying the logical condition.

3. The method of claim 1, wherein analyzing the text-based response to determine the sentiment score comprises utilizing the sentiment prediction machine learning model to generate the sentiment score by predicting a sentiment toward the indicated topic based on words used in the text-based response.

4. The method of claim 1, wherein the nested visual survey flow maps the branches of respective processes for administering the digital survey by:
mapping a first possible follow-up digital survey question that is triggered in response to determining that the sentiment score is within a first range of sentiment scores; and
mapping a second possible follow-up digital survey question that is triggered in response to determining that the sentiment score is within a second range of sentiment scores.

5. The method of claim 1, further comprising:
determining, based on analyzing the text-based response utilizing the sentiment prediction machine learning model according to the nested visual survey flow, an additional sentiment score for an additional topic within the text-based response; and selecting an additional follow-up digital survey question to provide based on determining that the additional sentiment score satisfies an additional logical condition of the nested visual survey flow arranged via the survey creation interface.

6. The method of claim 1, wherein determining that the sentiment score for the indicated topic satisfies the logical condition comprises determining that the sentiment score falls within a range from among a set of possible ranges of sentiment scores.

7. The method of claim 1, further comprising:

determining a magnitude for the text-based response according to the nested visual survey flow arranged via the survey creation interface, wherein the magnitude reflects an effort taken to generate the text-based response; and generating an overall score for the text-based response by combining the magnitude with the sentiment score according to the nested visual survey flow defining the respective processes for administering the digital survey.

8. The method of claim 7, wherein selecting the follow-up digital survey question is further based on determining that the overall score is within a particular range of overall scores according to the nested visual survey flow.

9. A system comprising:

at least one processor; and a non-transitory computer readable medium comprising instructions that, when executed by the at least one processor, cause the system to:

provide, to an administrator client device, a survey creation interface comprising a plurality of manipulable survey creation blocks arranged in a nested visual survey flow mapping logical conditions defining branches of respective processes for administering a digital survey;

in response to a first client device interaction to adjust the plurality of manipulable survey creation blocks within the survey creation interface, modify the nested visual survey flow to include a machine learning block that maps a sentiment prediction machine learning model to a branch of the logical conditions for administering the digital survey;

provide a digital survey question of the digital survey to a respondent client device;

receive, from the respondent client device, a text-based response to the digital survey question of the digital survey;

analyze, based on detecting that the branch for the machine learning block within the nested visual survey flow is triggered according to the logical conditions, the text-based response utilizing the sentiment prediction machine learning model of the machine learning block to identify an indicated topic and to determine a sentiment score associated with the indicated topic;

determine that the sentiment score for the indicated topic satisfies a logical condition from among the logical conditions mapped by the nested visual survey flow;

select, based on determining that the sentiment score for the indicated topic satisfies the logical condition, a follow-up digital survey question according to the nested visual survey flow arranged via the survey creation interface; and provide the follow-up digital survey question to the respondent client device.

10. The system of claim 9, further comprising instructions that, when executed by the at least one processor, cause the system to select the follow-up digital survey question by triggering the follow-up digital survey question according to the nested visual survey flow in response to satisfying the logical condition.

11. The system of claim 9, further comprising instructions that, when executed by the at least one processor, cause the system to analyze the text-based response to determine the sentiment score by utilizing the sentiment prediction machine learning model to generate the sentiment score by predicting a sentiment toward the indicated topic based on words used in the text-based response.

12. The system of claim 9, wherein the nested visual survey flow maps the branches of respective processes for administering the digital survey by:

mapping a first possible follow-up digital survey question that is triggered in response to determining that the sentiment score is within a first range of sentiment scores; and mapping a second possible follow-up digital survey question that is triggered in response to determining that the sentiment score is within a second range of sentiment scores.

13. The system of claim 9, further comprising instructions that, when executed by the at least one processor, cause the system to determine that the sentiment score for the indicated topic satisfies the logical condition by determining that the sentiment score falls within a range from among a set of possible ranges of sentiment scores.

14. The system of claim 9, further comprising instructions that, when executed by the at least one processor, cause the system to:

determine a magnitude for the text-based response according to the nested visual survey flow arranged via the survey creation interface, wherein the magnitude reflects an effort taken to generate the text-based response; and generate an overall score for the text-based response by combining the magnitude with the sentiment score according to the nested visual survey flow defining the respective processes for administering the digital survey.

15. The system of claim 14, further comprising instructions that, when executed by the at least one processor, cause the system to select the follow-up digital survey question further based on determining that the overall score is within a particular range of overall scores according to the nested visual survey flow.

16. A non-transitory computer readable medium comprising instructions that, when executed by at least one processor, cause a computer device to:

provide, to an administrator client device, a survey creation interface comprising a plurality of manipulable survey creation blocks arranged in a nested visual survey flow mapping logical conditions defining branches of respective processes for administering a digital survey;

in response to a first client device interaction to adjust the plurality of manipulable survey creation blocks within the survey creation interface, modifying the nested visual survey flow to include a machine learning block that maps a sentiment prediction machine learning model to a branch of the logical conditions for administering the digital survey;

provide a digital survey question of the digital survey to a respondent client device;

receive, from the respondent client device, a text-based response to the digital survey question of the digital survey;

analyze, based on detecting that the branch for the machine learning block within the nested visual survey flow is triggered according to the logical conditions, the text-based response utilizing the sentiment prediction machine learning model of the machine learning block to identify an indicated topic and to determine a sentiment score associated with the indicated topic;

determine that the sentiment score for the indicated topic satisfies a logical condition from among the logical conditions mapped by the nested visual survey flow;

select, based on determining that the sentiment score for the indicated topic satisfies the logical condition, a follow-up digital survey question according to the nested visual survey flow arranged via the survey creation interface; and provide the follow-up digital survey question to the respondent client device.

17. The non-transitory computer readable medium of claim 16, further comprising instructions that, when executed by the at least one processor, cause the computer device to select the follow-up digital survey question by triggering the follow-up digital survey question according to the nested visual survey flow in response to satisfying the logical condition.

18. The non-transitory computer readable medium of claim 16, further comprising instructions that, when executed by the at least one processor, cause the computer device to analyze the text-based response to determine the sentiment score by utilizing the sentiment prediction machine learning model to generate the sentiment score by predicting a sentiment toward the indicated topic based on words used in the text-based response.

19. The non-transitory computer readable medium of claim 16, wherein the nested visual survey flow maps the branches of respective processes for administering the digital survey by:

mapping a first possible follow-up digital survey question that is triggered in response to determining that the sentiment score is within a first range of sentiment scores; and mapping a second possible follow-up digital survey question that is triggered in response to determining that the sentiment score is within a second range of sentiment scores.

20. The non-transitory computer readable medium of claim 16, further comprising instructions that, when executed by the at least one processor, cause the computer device to determine that the sentiment score for the indicated topic satisfies the logical condition by determining that the sentiment score falls within a range from among a set of possible ranges of sentiment scores.

\* \* \* \* \*